(12) United States Patent
Nguyen

(10) Patent No.: US 12,081,372 B2
(45) Date of Patent: Sep. 3, 2024

(54) DECISION FEEDBACK EQUALIZER WITH HIGH INPUT SENSITIVITY AND IMPROVED PERFORMANCE FOR SIGNAL PROCESSING

(71) Applicant: SEMTECH CORPORATION, Camarillo, CA (US)

(72) Inventor: James Cong Nguyen, Portland, OR (US)

(73) Assignee: SEMTECH CORPORATION, Camarillo, CA (US)

( * ) Notice: Subject to any disclaimer, the term of this patent is extended or adjusted under 35 U.S.C. 154(b) by 21 days.

(21) Appl. No.: 18/105,744

(22) Filed: Feb. 3, 2023

(65) Prior Publication Data

US 2024/0267264 A1 Aug. 8, 2024

(51) Int. Cl.
*H04L 5/12* (2006.01)
*H04L 25/03* (2006.01)

(52) U.S. Cl.
CPC .. *H04L 25/03025* (2013.01); *H04L 25/03267* (2013.01); *H04L 2025/03777* (2013.01)

(58) Field of Classification Search
CPC ......... H04L 25/03025; H04L 25/03267; H04L 2025/03777
USPC ........................................................ 375/262
See application file for complete search history.

(56) References Cited

U.S. PATENT DOCUMENTS

| | | | |
|---|---|---|---|
| 9,369,313 B1 * | 6/2016 | Yu | H03F 1/0205 |
| 9,419,663 B2 * | 8/2016 | Lee | H04L 25/03159 |
| 10,097,383 B1 | 10/2018 | Bulzacchelli et al. | |
| 2014/0062597 A1 * | 3/2014 | Chuang | H03F 3/45 330/260 |
| 2015/0016496 A1 * | 1/2015 | Mukherjee | H04L 25/03878 375/233 |
| 2015/0312060 A1 | 10/2015 | Sinha | |
| 2019/0342129 A1 * | 11/2019 | Bhattacharyya | H04L 25/03057 |
| 2021/0174844 A1 * | 6/2021 | Choi | G11C 16/24 |

OTHER PUBLICATIONS

A. R. Chowdhury, N. Wary and P. Mandal, "A Regulated-Cascode Based Current-Integrating TIA RX with 1-tap Speculative Adaptive DFE," 2019 IEEE 62nd International Midwest Symposium on Circuits and Systems (MWSCAS), Dallas, TX, USA, 2019, pp. 790-793, doi: 10.1109/MWSCAS.2019.8885175.

J. Seo et al., "A 7.8-Gb/s 2.9-pJ/b Single-Ended Receiver With 20-Tap DFE for Highly Reflective Channels," in IEEE Transactions on Very Large Scale Integration (VLSI) Systems, vol. 28, No. 3, pp. 818-822, Mar. 2020, doi: 10.1109/TVLSI.2019.2955389.

(Continued)

*Primary Examiner* — Helene E Tayong
(74) *Attorney, Agent, or Firm* — Morgan, Lewis & Bockius LLP

(57) ABSTRACT

A decision feedback equalizer (DFE) may include a summer configured to receive a signal stream, and a plurality of feedback taps including a first feedback tap connected to the summer. The first feedback tap may include a pre-amplifier, a combined latch and a digital to analog converter (DAC). The pre-amplifier may be configured to be clocked by a first clock signal, wherein the pre-amplifier may be configured to receive an output signal of the summer and to receive a first postcursor generated by the DFE of a previous signal in the signal stream. The combined latch may be configured to be clocked by a first clock signal and a second clock signal. The DAC may be coupled to an output node of the combined latch. The first postcursor may be provided to the preamplifier without being provided to the summer.

20 Claims, 10 Drawing Sheets

(56) References Cited

OTHER PUBLICATIONS

H. Li, J. Sharma, C.-M. Hsu, G. Balamurugan and J. Jaussi, "A 100Gb/s-8.3dBm-Sensitivity PAM-4 Optical Receiver with Integrated TIA, FFE and Direct-Feedback DFE in 28nm CMOS," 2021 IEEE International Solid-State Circuits Conference (ISSCC), San Francisco, CA, USA, 2021, pp. 190-192, doi: 10.1109/ISSCC42613.2021.9365802.

M. Hekmat et al., "A 6Gb/s 3-tap FFE transmitter and 5-tap DFE receiver in 65nm/0.18μm CMOS for next-generation 8K displays," 2016 IEEE International Solid-State Circuits Conference (ISSCC), San Francisco, CA, USA, 2016, pp. 402-403, doi: 10.1109/ISSCC.2016.7418077.

M. Jeeradit et al., "Characterizing sampling aperture of clocked comparators," 2008 IEEE Symposium on VLSI Circuits, Honolulu, HI, USA, 2008, pp. 68-69, doi: 10.1109/VLSIC.2008.4585955.

X. Zhong, A. Bermak and C.-Y. Tsui, "A low-offset dynamic comparator with area-efficient and low-power offset cancellation," 2017 IFIP/IEEE International Conference on Very Large Scale Integration (VLSI-SoC), Abu Dhabi, United Arab Emirates, 2017, pp. 1-6, doi: 10.1109/VLSI-SoC.2017.8203481.

Y. Lin, K. Doris, H. Hegt and A. van Roermund, "A dynamic latched comparator for low supply voltages down to 0.45 V in 65-nm CMOS," 2012 IEEE International Symposium on Circuits and Systems (ISCAS), Seoul, Korea (South), 2012, pp. 2737-2740, doi: 10.1109/ISCAS.2012.6271875.

A. Roshan-Zamir, O. Elhadidy, H.-W. Yang and S. Palermo, "A Reconfigurable 16/32 Gb/s Dual-Mode NRZ/PAM4 SerDes in 65-nm CMOS," in IEEE Journal of Solid-State Circuits, vol. 52, No. 9, pp. 2430-2447, Sep. 2017, doi: 10.1109/JSSC.2017.2705070.

H. Wang, C.-C. Lee, A.-M. Lee and J. Lee, "A 21-Gb/s 87-mW transceiver with FFE/DFE/linear equalizer in 65-nm CMOS technology," 2009 Symposium on VLSI Circuits, Kyoto, Japan, 2009, pp. 50-51.

\* cited by examiner

DECISION FEEDBACK EQUALIZER WITH HIGH INPUT SENSITIVITY AND IMPROVED PERFORMANCE FOR SIGNAL PROCESSING

BACKGROUND

There has been a continuously increased demand for high bandwidth data transmission. However, communication channels often have limited bandwidth due to their physical constraints. Inter symbol interference (ISI) is introduced when a high date rate signal pulse is broadened beyond a unit interval (UI), therefore creating ISI with preceding bits (precursors) and succeeding bits (postcursors). ISI usually limits the high data rate transmission.

Equalizers are used at the transmitting or receiving end in the communication channel for compensating ISI introduced signal distortions. Linear equalizers may not be effective for losses over 20 dB to 50 dB because they may amplify high-frequency noises. A decision feedback equalizer (DFE) is a nonlinear equalizer for cancelling the ISI in the received input signal from feedbacks in a previously detected signal. However, current implementation of DFEs is also constrained by sensitivity and data rate bandwidth.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure.

Figure 1:
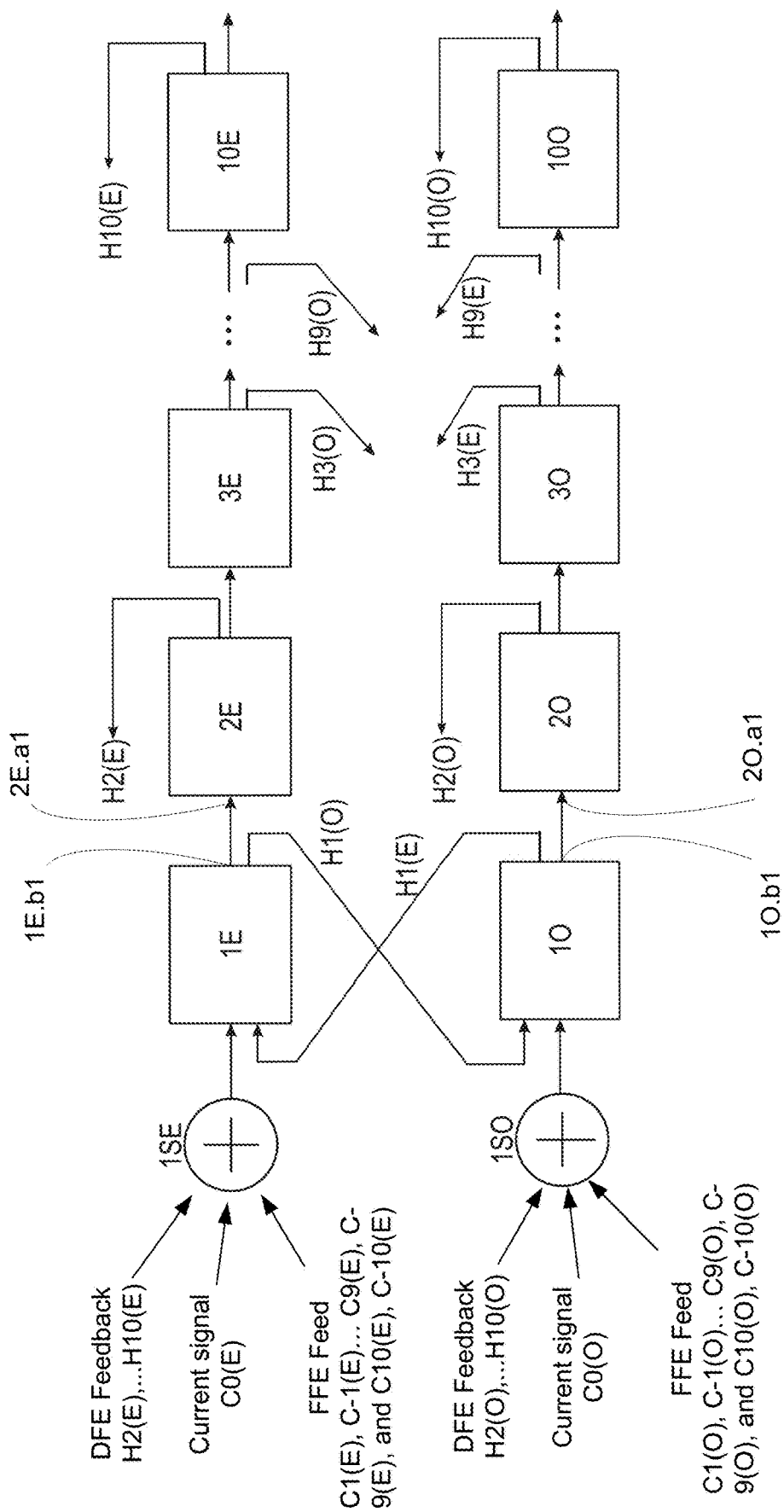
FIG. 1 illustrates a schematic diagram of an example decision feedback equalizer (DFE).

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates to equalization techniques for high-speed data communications, including, without limitation, to implementations of decision feedback equalizer with high-input sensitivity and improved performance for signal processing (e.g., PAM-n signal processing).

In one or more aspects of this present disclosure, a signal may include one or more signals. An input signal may include one or more input signals. An output signal may include one or more output signals. An input may include one or more inputs. An input may sometimes refer to an input node. An input node may include one or more input nodes. An output may include one or more outputs. An output may sometimes refer to an output node. An output node may include one or more output nodes.

A decision feedback equalization (DFE) may be used in a communication channel especially on a receiver side to compensate signal loss or distortion. Due to the transmission channel medium characteristics, the data signal may degrade or disperse during transmission and lose its bit wave shape. To restore the signal bit wave shape, the postcursor ISI from a previously received bit/signal may be cancelled from the currently received bit/signal. A DFE may have a plurality of time delayed taps which may be implemented to store the previously received bits. The time delayed taps may include flip-flops or latches. The postcursor ISIs may be calculated by each of time delayed taps from the stored previously received bits. Based on the calculation, the DFE on the receiver side may cancel the postcursor ISI in the received signal. When the number of the DFE delayed taps are equal to or greater than the number of postcursor ISI to be calculated, the received data may be recovered. However, DFE may have faced challenges for handling high speed, high data rate communications because of the internal time delay and reduced sensitivity within the different components of the DFE. In one or more aspects, a fast signaling and high sensitivity DFE for high bandwidth communication is disclosed herein which may utilize multi-state biasing and control to achieve multiple-overlapping states within the different components of DFE.

The DFE according to one or more aspects of the present disclosure may provide multiple-overlapping states (in mixed signal) to achieve high-speed and low-latency transition between a low gain state and a high gain state (at critical points) with high input sensitivity.

FIG. 1 illustrates a schematic diagram of an example DFE. In a dispersive/lossy channel, an input data signal may be distorted by broadening into the previous signals and the next signals after traveling through the channel. The signal described herein may be a bit, a pulse, or a data symbol in a signal stream. A main cursor on a signal waveform indicates the desired sample position for the signal. The precursors on the signal waveform indicate how the current signal interferes with detection of the preceding signals. The postcursors on the signal waveform indicate how the current signal interferes with the succeeding signals. The postcursors may be located at one unit interval (UI), 2UI, etc., from the location of the main cursor which respectively represent the ISI introduced in the next signal, the signal after it, and so on. UI may represent the time interval between the adjacent signals in the data stream. If the ISIs are large enough, an eye diagram of the received data signal would be closed, and equalization is needed to recover the signals from the signal stream.

A DFE 200 may include a plurality of feedback taps. The DFE in FIG. 1 may be a half-rate DFE clocked by an even main clock signal and an odd main clock signal. The DFE 200 may include a main even summer 1SE and a main odd summer 1SO. The main even/odd summer may be sometimes referred to as an even/odd summer, a main summer or a summer. The plurality of feedback taps include even feedback taps such as 1E, 2E, 3E, . . . 10E, etc., and odd feedback taps such as 1O, 2O, 3O, . . . 10O, etc. The even feedback taps and the odd feedback taps may be sometimes referred to as even interval feedback taps and odd interval feedback taps, respectively. The even feedback taps may be clocked by the even main clock signal and the odd feedback taps may be clocked by the odd main clock signal. Although FIG. 1 only displays 10 even feedback taps and 10 odd feedback taps, more taps (or a smaller number of taps) may be included in the DFE. The number of DFE taps may be determined by the number of postcursors that are desired to be subtracted from the new/current input signal.

Each feedback tap may produce a postcursor, e.g., a postcursor used as a compensating term to adjust the output of an equalizer. For example, the first even feedback tap 1E may produce the postcursor H1(O) which is the first odd postcursor, and the second even feedback tap 2E may produce the postcursor H2(E) which is the second even postcursor. In addition, the first even feedback tap 1E may produce another output through an output node 1E.b1 to an input node 2E.a1 of the second even feedback tap 2E. The first odd feedback tap 1O may produce the postcursor H1(E) which is the first even postcursor, and the second odd feedback tap 2O may produce the postcursor H2(O) which is the second odd postcursor. In addition, the first odd feedback tap 1O may produce another output through an output node 1O.b1 to an input node 2O.a1 of the second odd feedback tap 2O.

In FIG. 1, with respect to the even feedback taps, the first odd postcursor H1(O) of the first even feedback tap 1E is fed back to an input node of the first odd feedback tap 1O (instead of the odd summer 1SO or the even summer 1SE). All remaining odd numbered even feedback taps (e.g., 3E to 9E, excluding 1E) produce remaining odd numbered odd postcursors (e.g., H3(O) to H9(O), excluding H1(O), respectively. All of these remaining odd numbered odd postcursors (e.g., H3(O) to H9(O)) are fed back to an input node of the odd summer 1SO.

All even numbered even feedback taps (e.g., 2E to 10E) produce even numbered even postcursors (e.g., H2(E) to H10(E)). All of these even numbered even postcursors (e.g., H2(E) to H10(E)) are fed back to an input node of the even summer 1SE.

With respect to the odd feedback taps, the first even postcursor H1(E) of the first odd feedback tap 1O is fed back to an input node of the first even feedback tap 1E (instead of the odd summer 1SO or the even summer 1SE). All remaining odd numbered odd feedback taps (e.g., 3O to 9O, excluding 1O) produce remaining odd numbered even postcursors (e.g., H3(E) to H9(E), excluding H1(E), respectively. All of these remaining odd numbered even postcursors (e.g., H3(E) to H9(E)) are fed back to an input node of the even summer 1SE.

All even numbered odd feedback taps (e.g., 2O to 10O) produce even numbered odd postcursors (e.g., H2(O) to H10(O)). All of these even numbered odd postcursors (e.g., H2(O) to H10(O)) are fed back to an input node of the odd summer 1SO.

All the odd numbered feedback taps, such as 1E/1O, 3E/3O, . . . 9E/9O, etc., may have the same or similar structures. All the even numbered feedback taps, such as 2E/2O, 4E/4O, . . . 10E/10O, etc., may have the same or similar structures. An output node (e.g., 1E.b1) of each of the even feedback taps may be connected to an input node (e.g., 2E.a1) of the next even feedback taps. An output node (e.g., 1O.b1) of each of the odd feedback taps may be connected to an input node (e.g., 2O.a1) of the next odd feedback taps. The feedback taps, for example, 1E may cancel the interference from the previous even signal by subtracting the postcursor H1(E) from the current even signal. Similarly, the feedback tap 2O may cancel the interference from the previous odd signal two UIs earlier by subtracting the postcursor H2(O) from the current odd signal.

Figure 2:
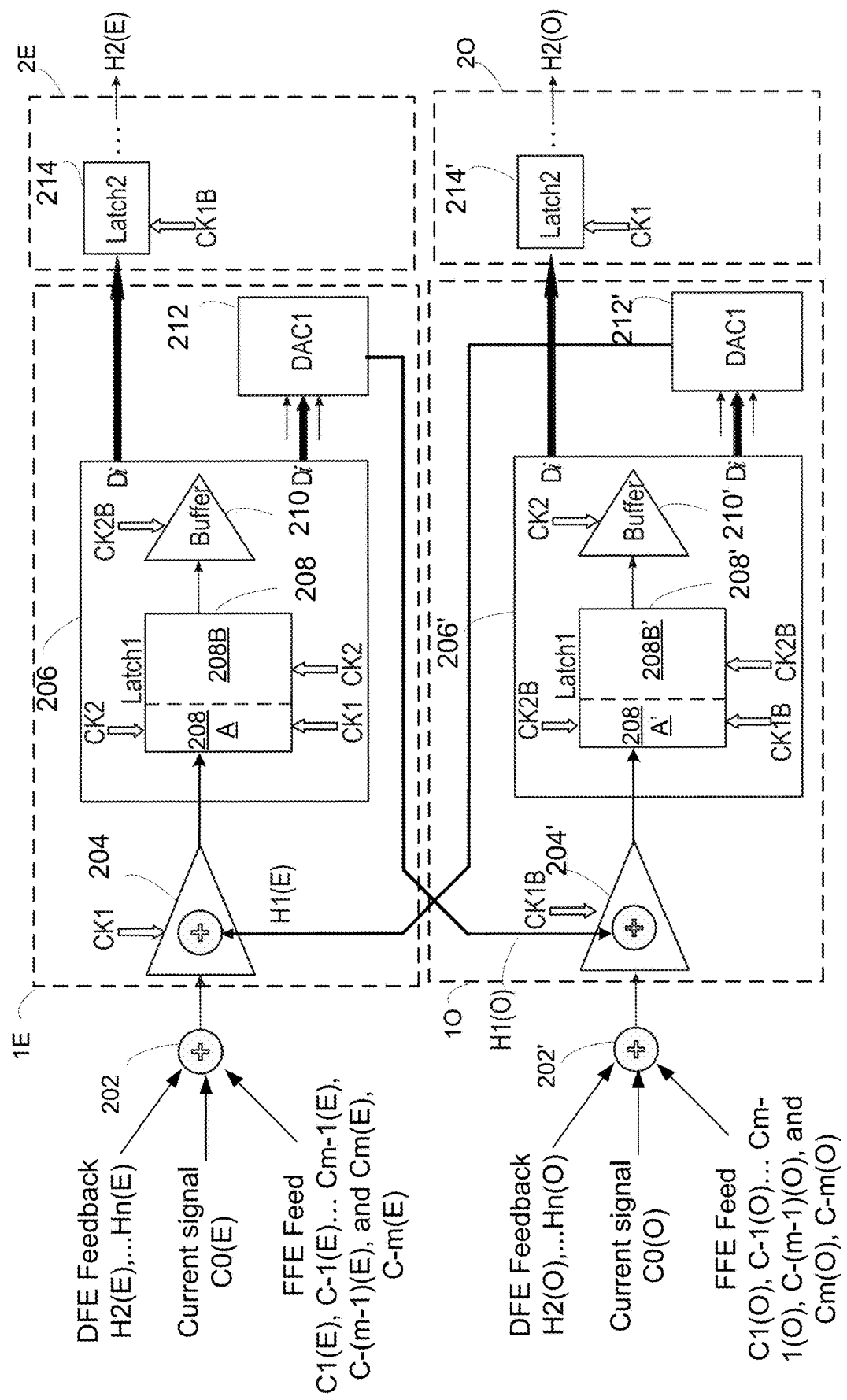
FIG. 2 illustrates a schematic diagram of a portion of an example DFE.

FIG. 2 illustrates an example schematic diagram of a portion of an example DFE 200, including an example of the summers and the feedback taps 1E and 1O. Referring to FIG. 2, in one or more example implementations, DFE 200 may include a summer 202 and a summer 202'. DFE 200 shows only a portion of the details of the components illustrated in FIG. 1. In some examples, the summer 202 may be the summer 1SE in FIG. 1, and the summer 202" may be the summer 1SO in FIG. 1. FIG. 2 illustrates the feedback taps 1E/1O and 2E/2O of FIG. 1 in more detail.

An input signal to the summer 202 may be a signal received from a network. The signal received from the network may include a bit stream or symbol stream. The signal received from the network may include an output signal of a feed-forward equalizer (FFE). C0 (or H0) may represent the current input signal (bit/symbol) in the signal stream, and may be input into both summers 202 and 204 at a full clock rate. The output signal of the FFE may include cursors C1, C-1 . . . Cm-1, C-(m−1), and Cm, C-m, of the bit/symbol stream, where m is a positive integer. The notation "m" may indicate a precursor, and the notation "-m" may indicate a postcursor. Hence, C1 . . . Cm-1 and Cm may represent precursors, and C-1, . . . C-(m−1) and C-m may represent postcursors. C0 may be the main cursor of the FFE, H0 may be the main cursor of DFE, and they may represent the same cursor on a signal waveform. For FFE, both precursors and postcursors may be implemented as tabs. For DFE, only postcursors may be implemented as tabs, namely H1, H2, H3, . . . Hn, where n is a positive integer. The postcursors H2, H3, . . . Hn−1, and Hn from previous bits/symbols in the bit/symbol stream may be fed back to the input of the summer 202.

In one or more example implementations, H0/C0 may also be down-sampled to C0(E) (current even tab) and C0(O) (current odd tab) at a half clock rate and be fed to the summers 202 and 202" respectively. In a half-rate clocked DFE, each of the cursors in the bit/symbol stream may include an even component and an odd component, for example, C0(E) (or H0(E)), C0(O) (or H0(O)), C1(E), C1(O), C-1(E), C-1(O), . . . Cm-1(E), Cm-1(O), C-(m−1)(E), C-(m−1)(O), Cm(E), Cm(O), C-m(E), C-m(O), and H1(E), H1(O), H2(E), H2(O), H3(E), H3(O) . . . Hn-1(E), Hn-1(O), and Hn(E), Hn(O). As shown in FIG. 1, only the even components (excluding H1(E)) may be fed into the summer 1SE (for example, the summer 202 in FIG. 2), and only the odd components (excluding H1(O)) may be fed into the summer 1SO (for example, the summer 202' in FIG. 2). Each of the summers 202 and 202' may sum all of its input signals received at its input and produce an output signal at its output. In FIG. 1, the FFE cursors are shown with m being 10; hence, FIG. 1 illustrates the FFE cursors C0(E), C0(O), C1(E), C1(O), C-1(E), C-1(O), . . . C9(E), C9(O), C-9(E), C-(9)(O), C10(E), C10(O), C-10(E), C-10(O) that are fed into the respective summers 1SE and 1SO.

In one or more example implementations, the output of the summer 202 may be directly/immediately connected to a first input node of a pre-amplifier 204. In addition, the output of the summer 202' may be directly/immediately connected to a first input node of a pre-amplifier 204".

Figure 3A:
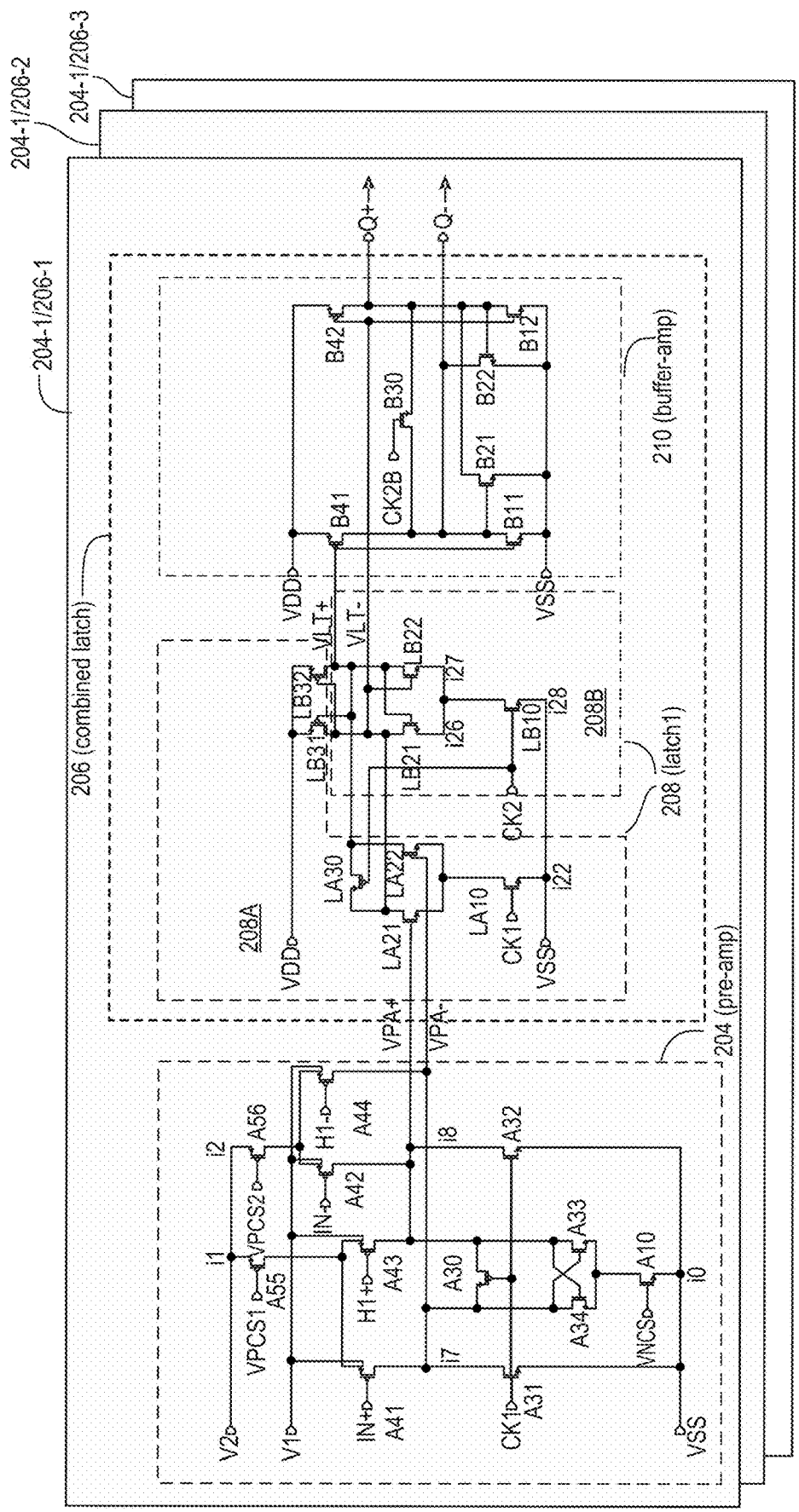
FIG. 3A illustrates an example circuit diagram of a pre-amplifier and a combined latch within a first feedback tap of an example DFE.
Figure 3B:
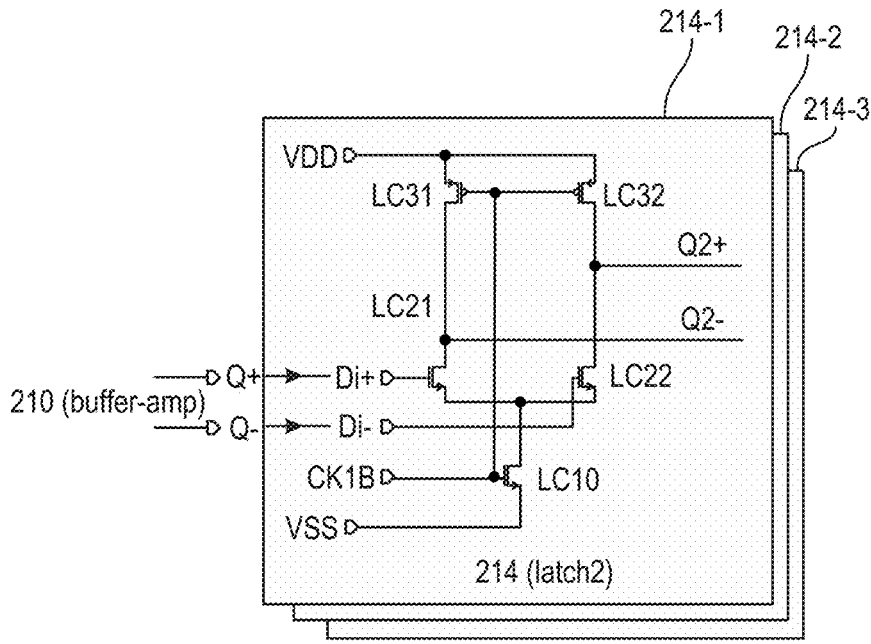
FIG. 3B illustrates an example circuit diagram of a second latch within a second feedback tap of an example DFE.
Figure 3C:
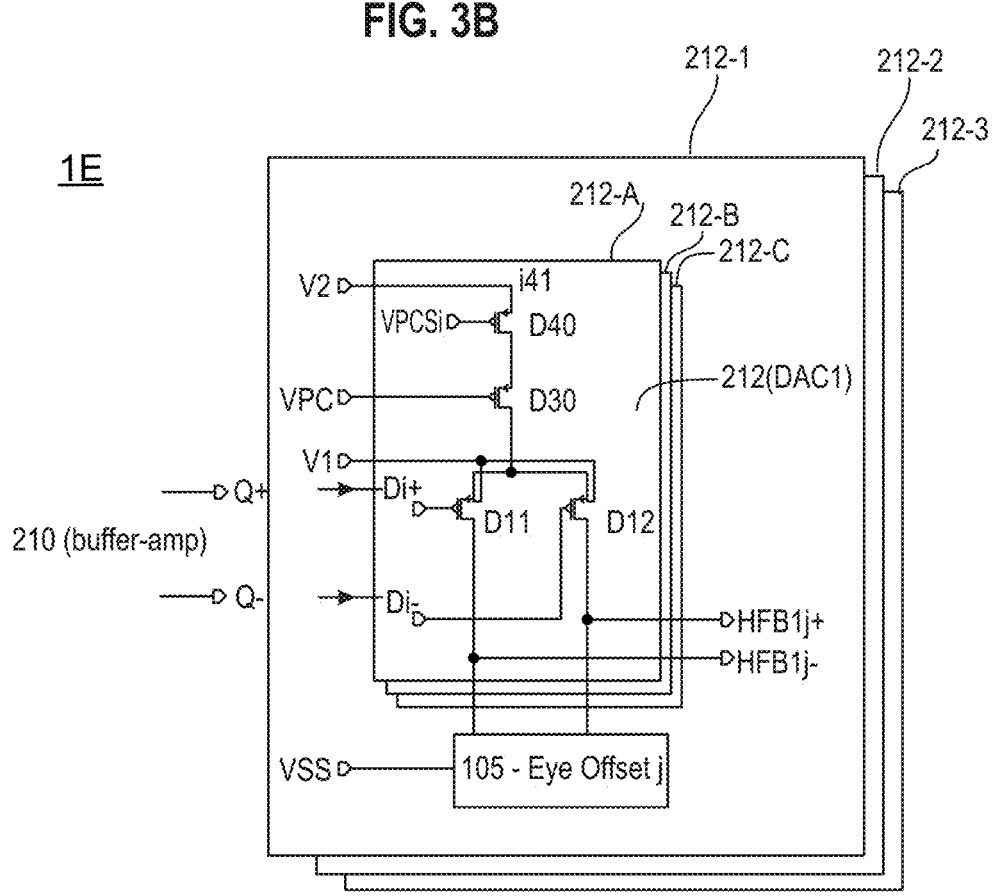
FIG. 3C illustrates an example circuit diagram of a digital to analog converter (DAC) of an example DFE.

FIGS. 3A-3C illustrate example circuit diagrams of a portion of an example DFE 200, including example circuits within the feedback taps 1E and 2E. FIG. 3A illustrates an example circuit diagram of a pre-amplifier and a combined latch within the feedback tap 1E of the DFE 200. FIG. 3B illustrates an example circuit diagram of a second latch within the feedback tap 2E of the DFE 200. FIG. 3C illustrates an example circuit diagram of a digital to analog converter (DAC) within the feedback tap 1E of the DFE 200. Each of FIGS. 3A-3C may be described below in connection with FIGS. 1 and 2 and other figures. In one or more examples, the transistors shown in FIGS. 3A-3C may be changed to an inverted version implemented with other related changes, such as a switched high/low current source/sink. For example, two versions of complementary metal-oxide semiconductor (CMOS) of two circuit topologies may be implemented and one of the circuit topologies is the inverted version of the other.

In one or more example implementations, as shown in FIGS. 2, 3A and 3C, the feedback tap 1E may include a pre-amplifier 204, a combined latch 206, and a DAC 212. The feedback tap 1O may include a pre-amplifier 204", a combined latch 206', and a DAC 212". The structure of the feedback tap 1O may be the same or similar to that of the feedback tap 1E. As shown in FIGS. 2 and 3B, the feedback tap 2E may include a second latch (latch2) 214. The feedback tap 2O may include a second latch (latch2) 214'. The structure of the feedback tap 2O may be the same or similar to that of the feedback tap 2E.

With respect to the feedback tap 1E, the pre-amplifier 204 has a summer component integrated in the pre-amplifier 204. The summer component integrated in the pre-amplifier 204 may receive a first input signal from the output of the summer 202 and a second input signal (a feedback postcursor H1 in FIG. 3A) from the previous bit/symbol received in the DFE 200.

As described in more detail later in connection with FIGS. 4A and 6, 1E of FIG. 3A is illustrated for a case of PAM-4 (having three eyes), and thus 1E for PAM-4 may include three pre-amplifiers 204-1, 204-2, and 204-3. For PAM-4, H1 as shown in FIG. 3A may represent H1$i$, where $i$ represents an index (e.g., 1, 2, 3) of the three eyes of PAM-4. Each of the three pre-amplifiers 204-1 ($i$=1), 204-2 ($i$=2), and 204-3 ($i$=3) may receive its respective H1$i$ (e.g., a respective one of H11, H12, and H13). Thus, H1 as shown in FIG. 3A (for PAM-4) may represent a component of H1(E) of FIGS. 1 and 2. The set of H11, H12 and H13 may represent H1(E) of FIGS. 1 and 2.

In one or more aspects, a first DFE postcursor may be represented using various notations. For example, when a half-rate DFE 200 is used, a first DFE postcursor may be represented as H1(E) or H1(O) of FIGS. 1 and 2. When the half-rate DFE 200 is used with a PAM-4 data format, a first DFE postcursor for 1E of the DFE 200 may have three components (e.g., H11, H12 and H13) as described above. If the DFE 200 is used for a PAM-n data format, the first DFE postcursor for 1E may have n−1 number of components.

In one or more advantageous aspects, having a separate path (a path to a different summer than the main summer 202 or 202") for the first DFE postcursor (e.g., H1 of FIG. 3A; or H1(E) or H1(O) of FIG. 2) may allow more optimized bandwidth and gain for the first DFE postcursor. For example, feeding H1 of FIG. 3A (or H1(E) or H1(O)) back to the pre-amplifier 204 (rather than to the summer 202 or 202) may advantageously improve the bandwidth and gain for H1 of FIG. 3A (or H1(E) or H1(O)). The main summers 202 and 202" may receive input signals from multiple tabs; thus, the loading may severely limit the output bandwidth. Furthermore, for a half-rate operation, the bandwidth may be advantageously limited to cut out high-frequency noise from the input and other sources. Thus, having a separate path for the first DFE postcursor (e.g., H1, H1(E), or H1(O)) may advantageously allow more optimized bandwidth and gain for the first DFE postcursor. Since signal asymmetric distortion tends to occur at a substantially high frequency, the separation (or providing a separate path for the first DFE postcursor) may also allow additional flexibility in optimization for a set of multiple H1 coefficients (e.g., HFB1$j$ in FIG. 3C; HFB11', HFB12' and HFB13' in FIG. 6).

In one or more example implementations, as shown in FIGS. 2 and 3A, the output signal of the summer 202 may be input into the pre-amplifier 204 as a first input signal, including first differential input signals IN+ and IN−. The pre-amplifier 204 may receive a second input signal H1 of FIG. 3A (or H1(E) of FIG. 2) from the previous bit/symbol of the DFE 200. H1 may include differential signals, such as H1+ and H1−, as illustrated in FIG. 3A.

In addition, as shown in FIG. 3A, the pre-amplifier 204 may include an amplifier circuit which amplifies its input signals. The pre-amplifier 204 may receive the first differential input signals IN+ and IN− from the output of the summer 202 and the second differential input signals H1+ and H1−. The pre-amplifier 204 may then amplify the difference for each pair of signals with similar common mode voltages, e.g., IN+, and H1+, IN−, and H1−, and then output the difference for the two pairs of the signals as its output signal (see equation below). The output signal may be differential output signals VPA+ and VPA−. The amplified ratio between the output and input signals may be defined as the gain of an amplifier. In one or more aspects of the present disclosure, a voltage gain may be referred to as a gain. If the gain of the pre-amplifier 204 is A, then [(VPA+)−(VPA−)]= A*[((IN+)−(H1+))−((IN−)−(H1−))].

In one or more example implementations, the pre-amplifier 204 may be clocked by a clock signal CK1 as shown in FIGS. 2 and 3A. Compared with other previous methods, wherein an on/off is triggered based on a predetermined cut-off of the input signal of the amplifier, in an advantageous aspect of the present disclosure, one or more continuous bias voltages are applied to the pre-amplifier 204. In this regard, the pre-amplifier 204 may receive static, continuous biases (or bias voltages/currents) VPCS1, VPCS2 and VNCS. For example, as shown in FIG. 3A, current i1 may be controlled by VPCS1, current i2 may be controlled by VPCS2, and current i0 may be controlled by VNCS.

Figure 5:
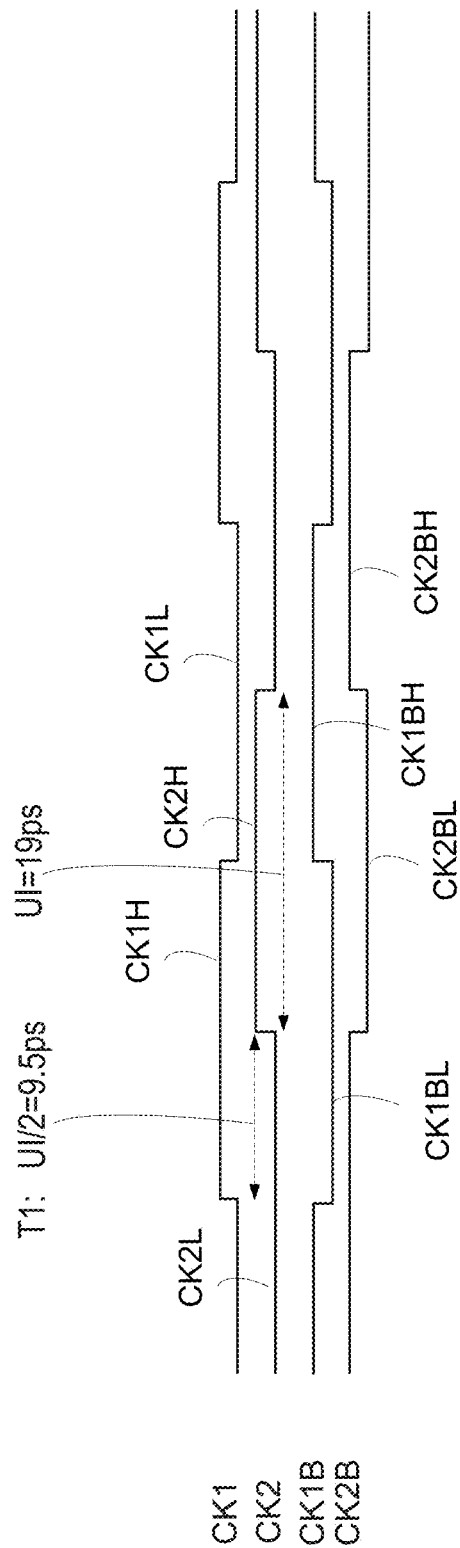
FIG. 5 illustrates a diagram of example clock signal levels implemented by an example DFE.

As illustrated in FIG. 5, which shows a diagram of example clock signal levels implemented by the DFE 200, in one or more example implementations, the pre-amplifier 204 may receive a clock signal CK1, which is at a high clock signal level CK1H (e.g., a high level of CK1 as illustrated in FIG. 5).

Referring back to FIG. 3A, in one or more example implementations, the output signals (VPA+ and VPA−) of the pre-amplifier 204 are directly/immediately connected to the input of a combined latch 206.

In one or more example implementations, as shown in FIGS. 2 and 3A, the combined latch 206 includes a latch1 208 and a buffer 210. The buffer 210 may be sometimes referred to as a buffer-amp 210 (buffer amplifier). The latch1 208 may also be clocked by a clock signal CK2. The latch1 208 shown in FIGS. 2 and 3A may include a latch amplifier component 208A. The latch amplifier component 208A may receive the same clock signal CK1 (received by the pre-amplifier 204). The clock signal CK2 may be half rate delayed from the clock signal CK1 as shown in FIG. 5. In some examples, the clock signal CK2 may be delayed by a defined time from the clock signal CK1 based on a system requirement, and CK1 and CK2 may be both synchronized by a main clock.

In one or more example implementations, the clock signal CK2 may be provided to both the latch amplifier component 208A (e.g., a transistor LA30) and the main latch component 208B of latch1 208 (e.g., a transistor LB10). In some examples, this gain A of the pre-amplifier 204 may be further enhanced by the amplification of 208A to produce its output signal [(VLT+)−(VLT−)], in a parallel way, improving the input sensitivity with respect to the main latch component 208B (a main regenerating latch).

There may be three different time phases. In the first time phase, when the clock signal CK1 is at a low clock signal level CK1L (e.g., a low level of CK1 as illustrated in FIG. 5) and when the clock signal CK2 is at a low clock signal level CK2L (e.g., a low level of CK2 as illustrated in FIG. 5), the pre-amplifier 204, the latch amplifier component 208A and the main latch component 208B of latch1 208 are all in a low gain mode. In the low gain mode, the gains of each of the pre-amplifier 204, the latch amplifier component 208A, the main latch component 208B of latch1 208, and the buffer 210 may be no greater than 1. A low gain mode (but not an "OFF" mode) for the pre-amplifier 204 may minimize the effect of the large previous input symbol memory.

In some examples, in a second time phase, when the clock signal CK1 switches from the low clock signal level CK1L to the high clock signal level CK1H, the pre-amplifier 204 may switch from the low gain mode to a high gain mode, while the latch amplifier component 208A, and the main latch component 208B of latch1 208 may still remain in the low gain mode. In the high gain mode, the gain of the pre-amplifier 204 may be greater than 1 (for example, the high gain is in the order of 10). In some implementations, for the pre-amplifier 204, the high gain may be significantly greater than 1 and may be in the range of 5-20 for a 26.5 GHZ clock. One or more controlled bias voltages/currents may be applied to the pre-amplifier 204 for a fast response switching to a high gain state. When the clock signal level is low at CK1L, the static bias voltages/currents VPCS1, VPCS2 and VNCS may be controlled to achieve VPA+/VPA− at around V1 or VDD) as shown in FIG. 3A. VDD may be sometimes referred to as a high power supply voltage. VSS may be sometimes referred to as a low power supply voltage. In some examples, V1 may be 0.8V.

Therefore, there may be an overlapping state of the high gain from the output signal of the pre-amplifier 204 and the low gain from an input signal of the latch1 208. The output signal of the pre-amplifier 204 may be further amplified by the latch amplifier component 208A. The clock signal CK1 may turn on the latch amplifier component 208A for accepting the differential input signal (VPA+)−(VPA−) (wherein sign "−" means subtract, for example, subtracting VPA− from VPA+ to get a differential signal) to fully start the pre-amplifier 204 when CK1 is at the high clock signal level CK1H. The latch amplifier component 208A may remain in the low gain mode waiting for the clock signal CK2 to transit from a low clock signal level CK2L to a high clock signal level CK2H (as shown in FIG. 5).

The latch1 208 may be in a preparing stage when CK1 is at the high clock signal level and CK2 is at the low clock signal CK2L level and the latch amplifier component 208A is in the low gain mode. In this case, there may be an overlapping state of the on status of the input signal of the latch1 208 and the low gain mode of the output signal of the latch1 208. A controlled indirect bias may be applied to the latch1 208 for a fast response switching to a regenerating state with a high latching gain (and for the subsequent dynamic buffer 210). For example, the controlled VLT+/VLT− voltages (which are the output voltages of the latch1 208) may be in the upper half of the VDD range (but not necessarily at VDD).

Transistor LA10 (which may be connected in series with transistor LA21 and also in series with transistor LA22) and transistors LB31 and LB32 may be sized relatively to achieve an optimum bias voltage to latch1 208 when the latch amplifier component 208A is operating in the low gain mode.

In both the modes of the on status of the input signal of the latch1 208 and the low-gain mode of the output signal of the latch1 208, common-mode (CM) output voltage levels may be utilized to facilitate the following dynamic buffer 210 by passing the indirect bias. For example, as shown in FIG. 3A, when the latch1 208 is in the low gain mode, the controlled VLT+/VLT− voltage may be in the upper half of the VDD range (e.g., 5/8 to 3/4 of VDD), thus making the output voltages at the Q+/Q− output nodes substantially close to an intended low pre-charge "digital" voltage (for example, both output nodes, Q+ and Q−, are set to pre-charge voltage level which is close to VSS with respect to VDD). The DFE disclosed herein is different from a typical dynamic-logic pre-charge/evaluation which does not have multiple overlapping states.

In one or more example implementations, when the pre-amplifier 204 receives the clock signal CK1 being at the low clock signal level CK1L, the large previous input symbol memory of the pre-amplifier 204 may be cleared in a resetting step. On the latch1 208 side, with CK2 at the low clock signal level CK2L, clearing the memory of the pre-amplifier 204 may be done with the transistors LB10 off and LA30 on as shown in FIG. 3A. For example, with CK1 and CK2 both at a low clock signal level, both the pre-amplifier 204 and the latch1 208 are in the low-gain mode thus the memory is cleared for both. In some examples, the pre-amplifier 204 may only need the clock signal CK1 being at the low clock signal level CK1L to be in low-gain mode, which is not affected by the clock signal level of CK2.

In a third time phase, when the clock signal CK2 switches from the low clock signal level CK2L to the high clock signal level CK2H, the latch amplifier component 208A may switch from the low gain to a high gain mode and the main latch component 208B may switch from the low gain mode to a regenerating high gain mode. In the high gain mode, the gain of the latch amplifier component 208A may be greater than 1. In a regenerating high gain mode, the gain of the main latch component 208B may be no greater than 20, or in some examples in the order of 20-50 or more. For example, for the latch1 208 in a regenerating high gain mode, a small input signal gain achieved in several picoseconds (ps) is further illustrated herein. In one example, a small input signal of 5 mV may be fed at the input node of the pre-amplifier 204. The pre-amplifier 204 may have a gain of 10. Thus, the pre-amplifier 204 output signal may be at 50 mV which is also the input to the latch1 208. The gain of the combined latch 206 may be in the order of 8. For example, the gain of the latch1 208 may be 8 in 5 ps or 15 in 9.5 ps for the 26.5 GHZ clock. The output signal of the latch1 208 may be amplified and regenerated to near the supply voltages reaching 400 mV in 5 ps or 750 mV in 9.5 ps with (VDD-VSS)=800 mV. Regenerating/latching may refer to restoring the digital levels of the input signal. The combined effect of the pre-amplifier 204 and the latch amplifier component 208A may yield a high gain output from the latch amplifier component 208A.

As shown in FIG. 3A, the p-type field effect transistors (P-FETs) LB31 and LB32 may be wired as a cross-coupled pair, and thus provide regenerating capability with high gain to the latch1 208. The cross-coupled n-type field effect transistor (N-FET) pair, LB21 and LB22, may operate in parallel with the P-FETs LB31 and LB32; thus, the latch1 208 may switch to a regenerating (latching) mode. In some examples, P-FETs LB31 and LB32 may switch from a low gain mode to a regenerating mode while N-FETs LB21 and LB22 may switch from being off to a regenerating mode. A controlled indirect bias may be applied to the latch amplifier component 208A for a fast response switching to a regenerating state with a high latching gain. In the regenerating (latching) state, the cross-coupled inverter pairs P-FETs LB31 and LB32, and N-FETs LB21 and LB22 may start with a small [(VLT+)−(VLT−)] feeding voltage and drive the output signals until the voltage level is limited by either VDD or VSS. The start of latching (regenerating) for the latch1 208 may be initiated with CK2 going from low to high with contribution from both 208A and 208B. In some examples, the input half of the latch amplifier component 208A, including transistors LA10, LA21, and LA22, may be already on when the clock signal CK1 is at the high clock signal level CK1H. Meanwhile, the load transistors of LA30, LB31, and LB32 are in low-gain mode.

In some examples, the output node of the latch1 208 may be connected to the input node of the buffer 210 as shown in FIGS. 2 and 3A. The buffer 210 may be clocked by a clock signal CK2B. In one or more example implementations, as shown in FIG. 5, the clock signal CK2B may be inverse of the clock signal CK2, i.e., when the level of the clock signal CK2 is high at CK2H, the level of the buffer clock signal CK2B is low at CK2BL, and when the level of the clock signal CK2 is low at CK2L, the level of the buffer clock signal CK2B is high at CK2BH. For a half-rate DFE, in one or more example implementations, CK2B may represent an odd main clock signal. There may be an overlapping state of the low-gain state from the output of the latch1 208 and the low-gain analog pre-charge state of the buffer 210. Receiving, by the buffer 210, the buffer clock signal CK2B at a high clock signal level CK2BH may start the buffer.

Similar to the pre-amplifier 204, the buffer 210 may have a low gain and a high gain as a (limiting) amplifier. However, the buffer 210's operating mechanism may be different from that of the pre-amplifier 204. The inverter amplifier including the transistors B11 and B41 may be for signal processing from input VLT+ to output Q−. The inverter amplifier including the transistors B12 and B42 may be for signal processing from input VLT− to output Q+. The two inverter amplifiers may be coupled to achieve the desired operation and voltage levels in both modes.

The buffer 210 may be in a low gain mode when the clock signal CK2 is at a low level CK2L while the clock signal CK2B for buffer 210 is at a high level CK2BH. That may be the same time phase when the latch1 208 is in the low gain mode. In the low gain mode, the gain of the buffer 210 may be no greater than 1. In the low gain mode, both inverters (including the transistors B11 and B41, and transistors B12 and B42) may not be off but near the linear maximum gain point preparing for an amplifying action with minimum delay. VLT+/VLT− voltage may be biased on the upper half of VDD in the low gain mode. The coupling N-FET devices B21, B22, and B30 may be in a low gain mode and contribute to the pull down achieving low voltage levels on both outputs. Both outputs may be close to VSS. The output node of the buffer 210 may be configured to supply both inverted-return-to-zero (IRZ) differential input signals to analog DAC1 212 and differential pre-charged signals to the input nodes of a digital latch2 214 in FIG. 3B.

The buffer 210 may be in a (limiting) high gain amplifying mode when the clock signal CK2 is high at CK2H and the CK2B clock signal is low for the buffer 210 at CK2BL. That may be the same time phase when the latch1 208 is in the regenerating mode. A controlled indirect bias may be applied for a fast response switching to an analog evaluating state with a high gain as the buffer 210 is acting as a limiting amplifier. In this phase, VLT+ and VLT− may be in a regenerating mode with the "common mode" voltage shifted to the lower half of VDD. The coupling of the N-FET devices B21 and B22 may be in a partial regenerating (positive feedback) mode to provide a higher gain. The gain for the buffer 210 in the limiting high gain amplifying mode may be in the order of 2 or greater than 2. In some examples, a high gain of greater than 2 may be sufficient since VLT signal amplitude is relatively large. One output of Q+ or Q− may be amplified (or evaluated) to the VDD level.

In one or more example implementations, as shown in FIG. 5, the time interval (T1) between the change of the level of CK1 and the change of the level of CK2 is half of a unit interval (UI). A UI is the time used in a data stream by each subsequent pulse (or symbol/bit/symbol). In some examples, this interval between CK1 and CK2 may change, which may be a percentage of UI.

For a half-rate DFE, CK2 may represent an even main clock signal. For the 106 Gb per second (Gbps) pulse amplitude modulation 4-level (PAM-4) data format, UI=19 (pico second) ps. The present disclosure is not limited to the foregoing example, and may be implemented when the data range is above 100 Gbps PAM-4 data. In some examples, the present disclosure may cover the data range at or above 53 Gbps PAM-4 data. In some examples, a 50 Gbaud device may be capable of supporting a base data rate of 100 Gbps when used with PAM-4 data. In some examples, the present disclosure may be used for lower rates, such as 25 Gbps and 10 Gbps with PAM-4 data.

Figures 4A, 4B:
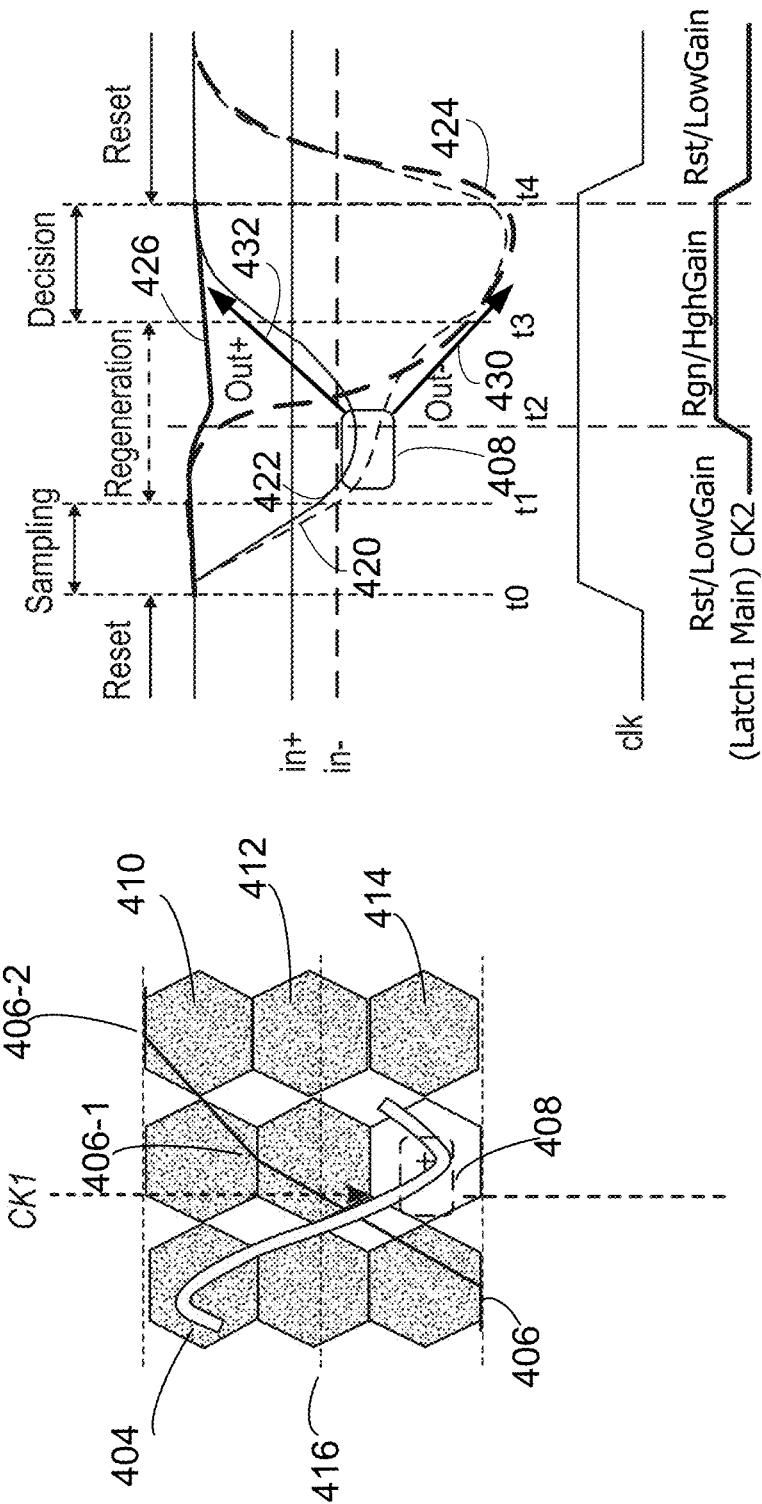
FIG. 4A illustrates a diagram of an example input signal from a main summer to a pre-amplifier of an example DFE.
FIG. 4B illustrates a diagram of an example output signal from a feedback tab of an example DFE.

FIG. 4A illustrates a diagram of an example input signal from the main summer 202 to the pre-amplifier 204 of the DFE 200. In FIG. 4A, an example input differential signal [(IN+)−(IN−)] from the summer 202 to the pre-amplifier 204 is displayed as 404. The horizontal position 406-1 of the line 406 may represent a main cursor H0, and the horizontal position 406-2 of the line 406 may represent the postcursor H1(E) of FIG. 2 (or H1 of FIG. 3A). For an input signal in a PAM-4 format, a top eye is shown as 410, a middle eye is shown as 412, and a bottom eye is shown as 414. Each of the eyes has an amplitude. The signal may complete a [−3 to +3] amplitude transition in two UIs (one UI is the width of each hexagon). The "+" location within the box 408 may indicate a bottom-eye fixed offset from the middle line 416 vertically. The clock signal CK1 may rise to a high level state CK1H to switch the pre-amplifier 204 from the low gain mode to the high gain mode when the input signal (in+)−(in−)= ((IN+)−(H1+))−((IN−)−(H1−)) is small (for example, within the bottom 30%, for example, within the bottom 2.5%, amplitude range of the whole input signal amplitude range).

In one or more example implementations, as shown in FIGS. 2, 3A, and 3C, the combined latch 206 may make a decision Di based on the information of an eye of the input signal. In this example, i may be 1, 2, or 3, where 1 may correspond to the top eye, 2 may correspond to the middle eye, and 3 may correspond to the bottom eye. The DFE 200 may be configured to receive signals in a pulse amplitude modulation n-level (PAM-n) format, where n is a positive integer. For example, if the input signal is in a PAM-2 format, the decision is based on one eye. If the input signal is in a PAM-4 format, the decision Di (or $D_i$) is based on one of the three eyes, such as a top eye 410, a middle eye 412, and a bottom eye 414 of the PAM-4 signal as shown in FIG. 4A.

In one or more example implementations, the output of the combined latch 206 is directly/immediately connected to an input of a digital to analog converter (DAC1) 212. The output signals Q+ and Q− of the combined latch 206 may be supplied as input signals Di+ and Di− of the DAC1 212. Di may be a binary decision, where i=1, 2, 3 representing each eye of a PAM-4 signal. Each of the DAC1s 212-1, 212-2, and 212-3 may take summation of the three decisions with the H1 components H1i (or H1$i$). In the example for a PAM-4 signal (having three eyes), H1 has three components; that is, H1$i$=H11, H12, and H13, where H11 is for the top eye, H12 is for the middle eye, and H13 is for the bottom eye. In some examples, each of the DAC1s 212-1, 212-2, and 212-3 of the first even feedback tap (e.g., 1E) may perform summing of $\Sigma_{i=1}^{3}(D_i H1_i)$ for PAM-4 and provide the summed output signal (e.g., H1(O)) from the first even feedback tap (e.g., 1E) to the first odd feedback tap (e.g., to 1O, or to an input node(s) of a pre-amplifier 204' of 1O) for a DFE 200 implementing a half-rate clock. Similarly, a DAC1 212' of the first odd feedback tap (e.g., 1O) may provide its summed output signal (e.g., H1(E)) to the first even feedback tap (e.g., to 1E, or to an input node(s) of a pre-amplifier 204 of 1E).

FIG. 4B illustrates a diagram of an example output signal from a feedback tab of the DFE 200. In FIG. 4B, the input signal may be (in+)−(in−)=((IN+)−(H1+))−((IN−)−(H1−)). Curves 420 and 422 may represent output signals from a previous example feedback tab including a slicer with a controlling clock signal clk. The clock signal clk may rise to a high state at about time t0 and switch to a low state at about time t4. There may be different stages involved in the signal processing cycle. Before t0, the slicer is in a reset stage; between t0 to t1, the slicer is in a sampling stage; between t1 to t3, the slicer is in a regeneration stage; between t3 to t4, the slicer is in a decision stage; and after t4, the slicer returns back to the resetting stage. The regeneration starts when the slicer's input signal is small (for example, within the bottom 30% amplitude range of the whole input signal amplitude range).

Curves 424 and 426 may represent output signals from a previous example feedback tab including a (digital) dynamic latch with a controlling clock signal CK2. The clock signal CK2 may rise to a high state at about time t2 and switch to a low state at about time t4. There may be different stages involved in the signal processing cycle. Before t2, the dynamic latch is in a pre-charging stage; between t2 to t4, the dynamic latch is in an evaluation stage; and after t4, the dynamic latch returns back to the pre-charging stage. The evaluation, and potential regeneration, may start immediately with the rising edge of CK2 since the input is digital which means an input signal with a large amplitude.

Directions 430 and 432 may represent output signal move directions (see the curve shapes shown for Di+ and Di− in FIG. 7) from an example feedback tab including the latch1 208 (shown in FIG. 2) with a controlling clock signal CK2. The clock signal CK2 may rise to a high state at about time t2 and switch to a low state at about time t4. There may be different stages involved in the signal processing cycle. Before t2, the latch1 208 may be in a resetting/low-gain mode stage; between t2 to t4, the latch1 208 may be in a regeneration/high-gain mode stage; and after t4, the latch1 208 may return to the resetting/low-gain mode stage. In some examples, in FIG. 4B, within the timeframe from t0 to t2, the critical high-gain regeneration may be started immediately at the end of box 408. The low gain output of 208A may be set at the critical regeneration level for 208B. In general, the total regenerating time may be divided into three phases, phase 1: t0 to t1 to t2, phase 2: t2 to t3, and phase 3: t3 to t4. In some examples, from t1 to t2 timeframe, regeneration gain and speed may be lower before the latch1 208 reaches a critical regeneration level. After the latch1 208 reaches the critical regeneration level, from t2 to t3 timeframe, regeneration may occur at a significantly higher gain and speed. Both timeframes may allow the removal of a large previous memory. In FIG. 4B, large memory may exist before the falling edge of CK2, i.e., at t4 time transition from full regeneration/latching to low-gain/resetting for the 208B output signal. In one or more implementations, t3 to t4 timeframe may not be needed for Di+ and Di− to provide sufficient input level to both DAC1 212 and Latch2 214 as shown in FIG. 2.

In some examples, the fast phase of regeneration may start with the rising edge of CK2 even when the input signal to the pre-amplifier 204 and latch1 208 is very small (for example, within the bottom 2.5% amplitude range of the whole input signal amplitude range) as shown within the amplitude range in region 408. Herein, the input signal parameters may be with respect to the input signal of the combined components of pre-amplifier 204 and latch 1 208.

Both the above previous slicer and (digital) dynamic latch implementations are based on on/off mode switching while the latch1 208 implementation utilizes continuous bias voltages/currents as discussed above. In some examples, for the latch1 208, the bias current i22 may not be continuous but overlapping with CK2 rising edge, turning on at 9.5 ps before the CK2 rising clock edge, and remaining on for 9.5 ps after the CK2 rising clock edge. As long as 9.5 ps is sufficient to setup and hold the biasing relative to the CK2 rising edge, 208 biasing may appear to be continuous (at least relative to the CK2 rising signal edge). The previous implementations suffer some disadvantages. For example, the slicer implementation has a slower response after the controlling clock starts. The (digital) dynamic latch requires a large signal amplitude for the evaluation. The latch1 208 implementation shows a fast response after the rise of the controlling clock signal CK2 which requires a small amplitude input signal for the regeneration/evaluation to achieve a high sensitivity.

Figure 6:
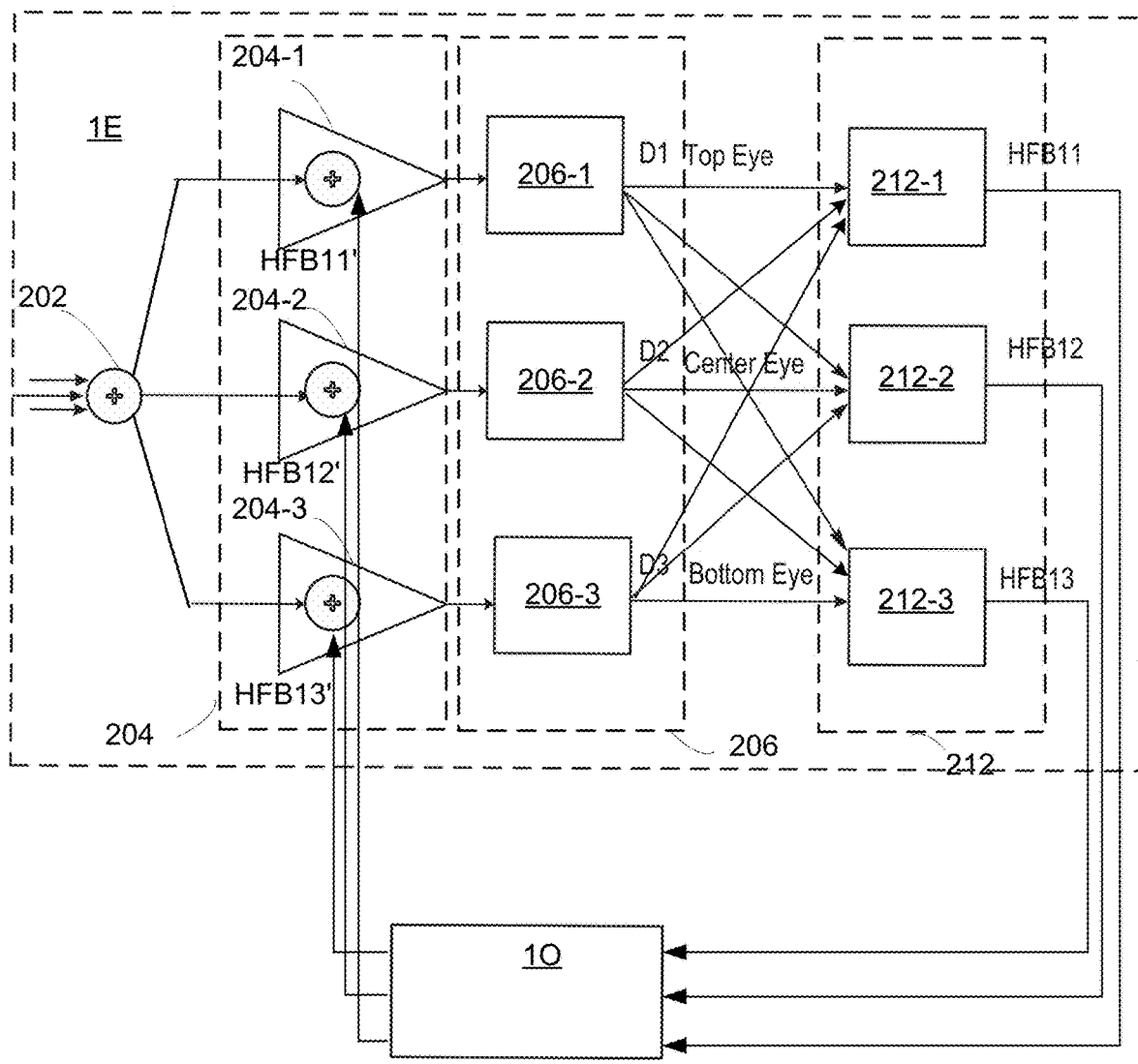
FIG. 6 illustrates a diagram of an example DFE with a set of pre-amplifiers, combined latches and DACs.

FIG. 6 illustrates a diagram of a portion of an example DFE 200, including the first feedback tabs 1E and 1O. In FIG. 6, the first even feedback tab 1E may have n number of pre-amplifiers, m number of combined latches, and m*n number of DAC1 components for processing three eyes of a PAM-4 signal, where m is 3 and n is 3 for PAM-4 (as it has three eyes). Each of the numbers "m" and "n" may be a positive integer determined by the number of eyes in a PAM-n signal. For example, for a PAM-4 signal, m is 3 and n is 3. For a PAM-2 signal, m is 1 and n is 1; hence, a feedback tab 1E for a PAM-2 signal has one pre-amplifier, one combined latch, and one DAC1.

In one or more example implementations, the feedback tab 1E of the DFE 200 in FIG. 2 may have multiple pre-amplifiers 204, combined latches 206 and DAC1 212 corresponding to the number of eyes in the input signal, as shown in FIGS. 3A-3C and FIG. 6. For example, in order to process the three eyes of the PAM-4 input signal, the feedback tab 1E may have three pre-amplifiers 204 and three combined latches 206 (shown as 204-1/206-1, 204-2/206-2 and 204-3/206-3 in FIGS. 3A-3C and FIG. 6), and three DAC1s 212 (shown as 212-1, 212-2, and 212-3 in FIGS. 3A-3C and FIG. 6). As shown in FIG. 3C, each of DAC1s 212-1, 212-2 and 212-3 has three DAC1 components. For example, DAC1 212-1 of FIG. 3C has three DAC1 components 212-A, 212-B and 212-C. DAC1 212-2 of FIG. 3C has three DAC1 components 212-A, 212-B and 212-C. DAC1 212-3 of FIG. 3C has three DAC1 components 212-A, 212-B and 212-C.

The same output signals of the summer 202 may be provided as the input signals IN+ and IN− of each of the three pre-amplifiers 204-1, 204-2 and 204-3. One of the three pre-amplifiers 204 and a corresponding one of the three combined latches 206, and a corresponding one of the three DAC1s 212 (e.g., 204-1, 206-1 and 212-1) may be connected in sequence. In total, three sets of the pre-amplifier 204, combined latch 206, and DAC1 212 (where each set of DAC1 212 contains three DAC1s) may be used to process the three eyes of the PAM-4 input signal in order to output the three decisions (Di=D1, D2 and D3) for the postcursor H1 components (e.g., H11 for the top eye, H12 for the central eye, and H13 for the bottom eye).

As shown in FIGS. 3C and 6, DAC1 212 may include n number of DAC1s (e.g., 212-1, 212-2, and 212-3), where each of the n number of DAC1s includes m number of DAC1 components (e.g., 212-A, 212-B, and 212-C). The number n may be indexed by j, and the number m may be indexed by i. Hence, each of the DAC1s 212-1 (j=1), 212-2 (j=2), and 212-3 (j=3) may take summation of the three decisions with the H1 components H11, H12 and H13 as $\Sigma_{i=1}^{m}$ Di*IijH1i, where m=3, i=1, 2, 3, j=1, 2, 3 for a PAM-4 signal. In some examples, m may correspond to the number of eyes for a PAM-n signal. Di may be a binary decision for each of the eye for PAM-4 signal while Iij may be an analog coefficient representing an eye threshold offset (e.g., eye offset j 105 in FIG. 3C).

After each of the DAC1s 212-1, 212-2, and 212-3 sums the output signal from each of the combined latches 206, each of the DAC1s 212-1, 212-2, and 212-3 may generate a postcursor H1 signal HFB1j (as shown in FIG. 3C) which may be an analog signal. As discussed above, a separate path (a path to a pre-amplifier 204 instead of the main summer 202 or 202") for H1 may allow additional flexibility in optimization for a set of multiple H1 coefficients such as coefficient Iij going to HFB1j. The HFB1j postcursors' outputs from the DAC1 212 include: HFB11 from DAC1 212-1; HFB12 from DAC1 212-2; and HFB13 from DAC1 212-3. Each HFB1j may include differential signals HFB1j+ and HFB1j−, as shown in FIG. 3C. Hence, in FIG. 6, HFB11 may include HFB11+ and HFB11−; HFB12 may include HFB12+ and HFB12−; HFB13 may include HFB13+ and HFB13−. For clarity, HFB1j may represent the output signal from each of the DAC1s 212-1, 212-2, and 212-3, and H1 components H1i may represent the input signal to each of the DAC1s 212-1, 212-2, and 212-3. In other parts of this disclosure, HFB1j and H1i may be used interchangeably.

HFB11, HFB12 and HFB 13 (from the respective DAC1s 212-1, 212-2 and 212-3 of the first even feedback tap 1E) may be fed into the first odd feedback tap 1O (as shown in FIGS. 1, 2 and 6). That is, each of HFB11, HFB12 and HFB 13 may be fed into a respective one of the three pre-amplifiers 204' within the first odd feedback tap 1O (see FIGS. 2 and 6). The set of HFB11, HFB12, and HFB13 of FIG. 6 may correspond to H1(O) of FIGS. 1 and 2.

In FIG. 6, the odd feedback tap 1O may generate three postcursors HFB11', HFB12', and HFB13' (in a manner similar to HFB11, HFB12, and HFB13) and feed each of HFB11', HFB12', and HFB13' back to the respective one of the pre-amplifiers 204-1, 204-2, and 204-3. The set of HFB11', HFB12', and HFB13' of FIG. 6 may correspond to H1(E) of FIGS. 1 and 2. Therefore, the feedback H1 may be the sum of the dynamic H1 feedback from Di and the fixed eye offset.

As shown in FIG. 3C, the eye offset j 105 in each of DAC1 212-1 (j=1), 212-2 (j=2), and 212-3 (j) may represent an eye threshold offset j for a respective eye. In this regard, each of the top/bottom eyes (e.g., j=1 and j=3) needs a significant positive/negative eye threshold offset respectively. As mentioned above, each of the DAC1 212-1, 212-2 and 212-3 has three DAC1 components as 212-A, 212-B and 212-C. One DAC1 component may be implemented per eye due to the unique offset for each eye. In some examples, each of the three DAC1 components 212-A, 212-B and 212-C may be a static DAC component without receiving the dynamic H1 feedback signal and may generate the unique offset for each eye. In FIG. 1, each of the even feedback taps 2E, 2O, 3E, 3O, . . . etc., may require a second DAC (DAC2) which may be similar to DAC1 but without the eye offset component 105.

In one or more example implementations, as shown in FIGS. 2, 3A and 3B, the output of the combined latch 206 in 1E may be directly/immediately connected to an input of a latch2 214. The latch2 214 may be clocked by a clock signal CK1B. When the clock signal CK1B reaches a high state CK1BH, the latch2 214 may enter a regenerating high gain state. In one or more example implementations, as shown in FIG. 5, a clock signal CK1B is inverse of CK1. For example, when the level of the clock signal CK1 is high at CK1H, the level of the clock signal CK1B is low at CK1BL, and when the level of the clock signal CK1 is low at CK1L, the level of the clock signal CK1B is low at CK1BH. In some examples, latch2 214 may be within an even feedback tab 2E (for example, as shown in FIG. 1). The output of latch2 214 may be fed into a DAC2 (not shown) within the tap 2E to generate a postcursor H2(E) which is fed back into the summer 1SE or 202 (see FIGS. 1 and 2). In some examples, for PAM-4, the latch2 215 may be implemented as three latch2s 214-1, 214-2, and 214-3 to handle three eyes as shown in FIG. 3B.

As shown in FIGS. 2 and 6, a half-rate DFE 200 may process signals in a data format (or a signal format) such as PAM-2, PAM-4, PAM-6, PAM-8, etc. A half-rate, quarter-rate, etc. sampling may be independent of the data or signal format (e.g., PAM-2, PAM-4, etc.). In one or more example implementations, each odd feedback tap may have a similar structure as that of a corresponding even feedback tap, except that the clock signals of an odd feedback tap may be inverse of those of an even feedback tap. For example, as shown in FIG. 2, an odd feedback tap 1O may include a pre-amplifier 204' clocked by CK1B (instead of CK1), a combined latch 206' clocked by CK1B and CK2B (instead of CK1 and CK2), a buffer 210' clocked by CK2, and a DAC1 212'. The odd feedback tap 1O may connect to a digital latch2 214' clocked by CK1.

Figure 7:
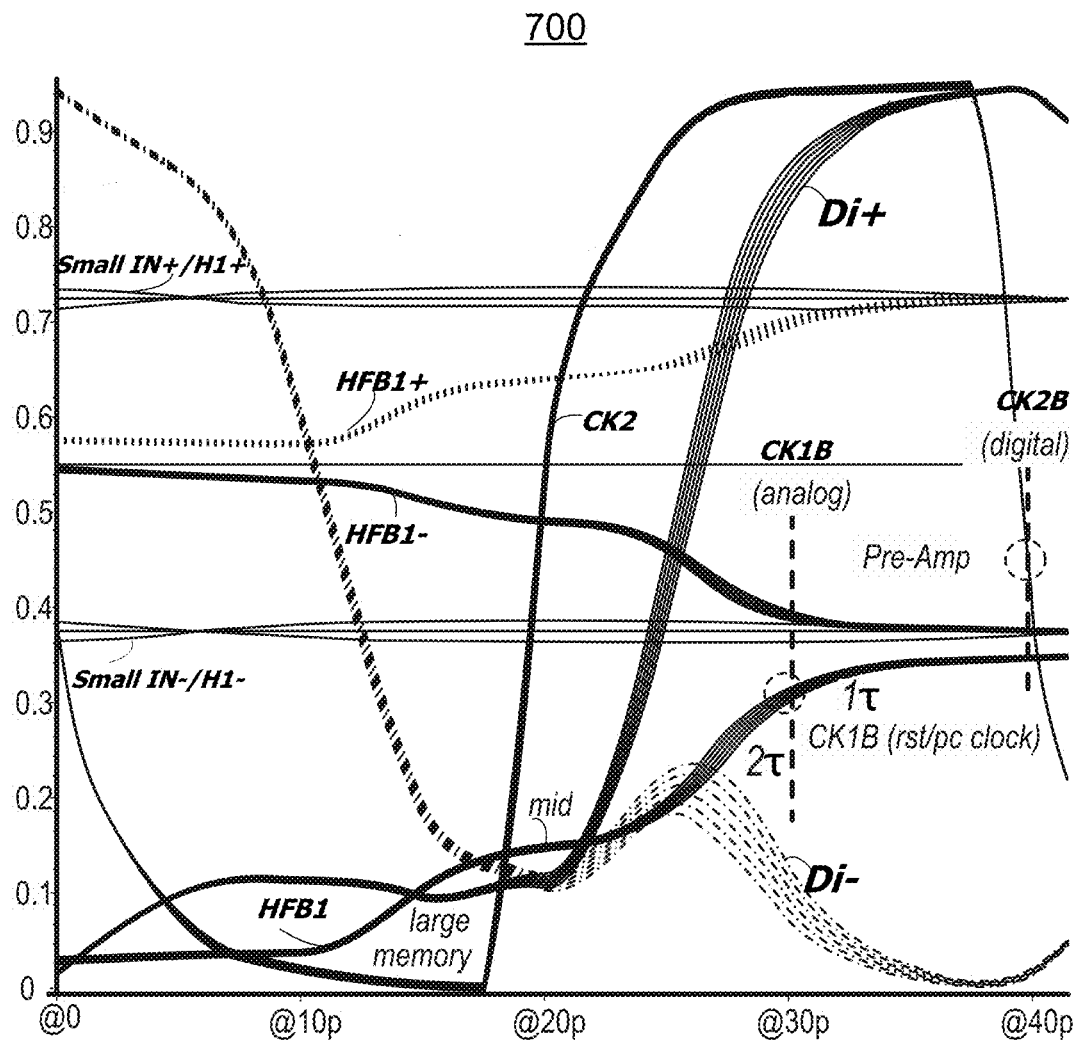
FIG. 7 illustrates an example of various input and output signal waveforms as a function of time for an example DFE.

FIG. 7 illustrates an example of various input and output signal waveforms as a function of time for an example DFE. For simplicity, only the signal changes for the top eye of a PAM-4 signal is displayed in FIG. 7. The vertical axis of the diagram 700 represents a normalized amplitude with a maximum value of 1. The horizontal axis of the diagram 700 represents time shown in pico second (ps) for a 106 Gb per second (Gbps) PAM-4 data format with UI=19 ps. The diagram 700 may represent the even tab to odd tab transitions, for example, the input signals into the even feedback tab 1E and the output signals from the even feedback tab 1E to the odd feedback tab 1O. The input signals IN and H1 to the pre-amplifier 204 may be simulated with small stressed "differential" input signals [(IN+)−(H1+)] and [(IN−)−(H1−)] shown as lines marked as "small IN+/H1+" and "Small IN−/H1−," respectively. In this case, common-mode voltages for IN+/H1+ and IN−/H1− at the effective top eye threshold offset may be set to a typical/appropriate level. The rise of the clock signal CK2 is reflected in the diagram 700, the rise of other clock signals CK1B and CK2B may be predicted when the clock signal CK1B is half UI delayed from the clock signal CK2, and the clock signal CK2B is half UI delayed from the clock signal CK1B as shown in FIG. 5. In some examples, the interval between the clock signals CK1 and CK2 may be determined as a predefined fraction of UI based on an optimal system performance. The resistor-capacitor (RC) time constant (in seconds) of an RC circuit, is equal to the product of the circuit resistance (in ohms) and the circuit capacitance (in farads). Time constant τ shown in diagram 700 may be determined by the circuit characteristics for the summing node output of DAC1 which may generate H1 feedback signal HFB1 which can be fed into the odd feedback tab 1O. The HFB1 signal may be the differential signal of [(HFB1+)−(HFB1−)]. HFB1 of FIG. 7 may represent HFB11 of FIG. 6.

One advantage of the DFE disclosed herein may be seen from FIG. 7 in that the decision Di+/Di− regeneration by the combined latch 206 (shown in FIG. 2) is nearly immediate (within 2τ) after the rise of the clock signal CK2. Another advantage may be that the HFB1 signal may reach its first time constant τ starting time nearly immediately after the rise of the clock signal CK2 from the point marked as "mid" on diagram 700. In addition, since the pre-amplifier(s) of the odd tab 1O switches to a high gain mode when the clock signal CK1B enters a high CK1BH level, from FIG. 7, the switching point CK1b of the odd pre-amplifier (for example, 204' in FIG. 2) to a high gain mode is about optimum because HFB1 reaches its peak within one time constant τ the clock signal CK1B starts to rise. A large initial switching time of the HFB1 which includes the first two time constants 2τ, from the point marked as "mid" on the diagram 700 may still fall on the left side of the rise of CK1B. The last (third) time constant which may account for the time for small signal settling may be within the right side of the rise of CK1B before the rise of CK2B. In some examples, the latch2 214 of the feedback tab 2E may also be clocked by CK1B (not CK2B) which may be only half UI from the main clock CK2 for the latch1 208 of the feedback tab 1E, that may allow more time for processing the feedback signals (or postcursors) H2, H3, . . . , etc. The feedback tab 3E may be clocked by CK1, the feedback tab 4E may be clocked by CK1B, and the feedback tab 4E may be clocked by CK1, so on.

In FIG. 7, when the clock signal CK1 is at the low clock signal level CK1L, the large previous input symbol memory of the pre-amplifier 204 may be cleared. When the clock signal CK2 is at the low clock signal level CK2L, the previous memory of the latch1 208 may be cleared. For example, with CK1 and CK2 both at a low clock signal level, both the pre-amplifier 204 and the latch1 208 are in the low-gain mode thus the memory is cleared for both.

Figure 8:
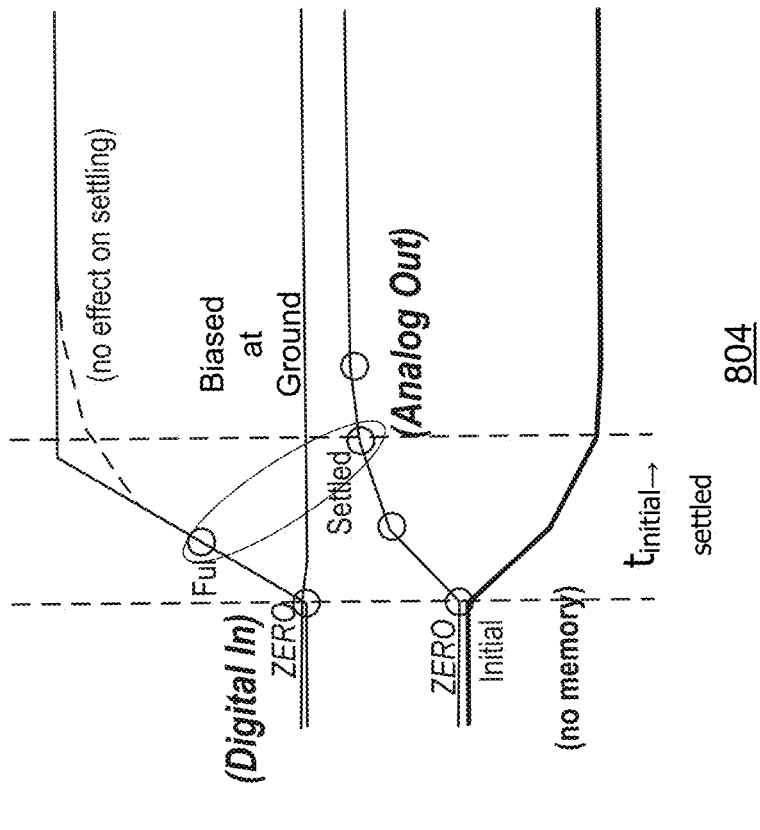
FIG. 8 illustrates a comparison of an exemplary signaling and interfacing portion of an DFE between an example DFE implementation and a previous DFE implementation.
Figure 8:
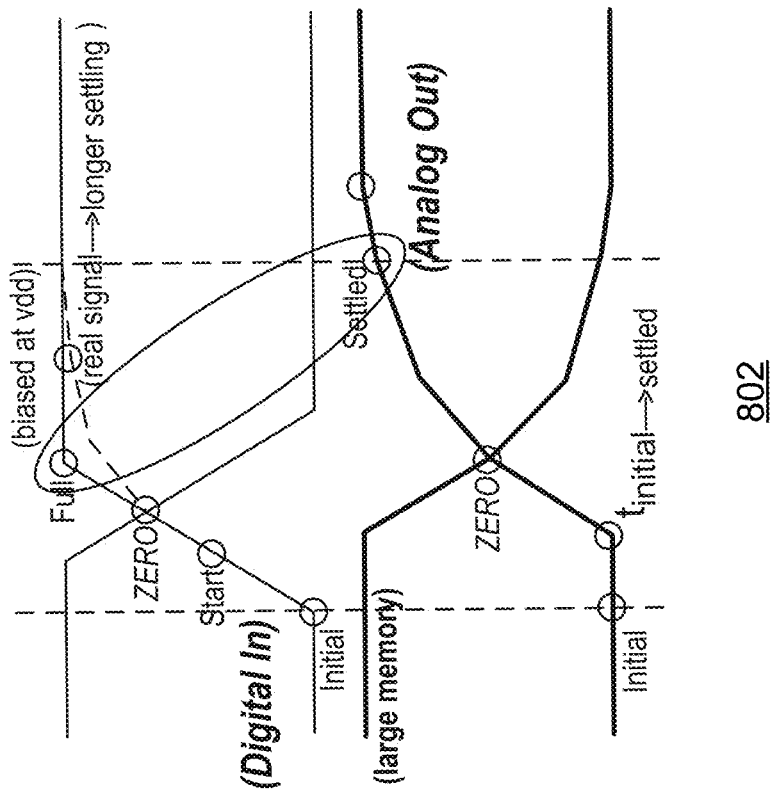

FIG. 8 illustrates a comparison of an exemplary signaling and interfacing portion of an DFE between an example DFE implementation and a previous DFE implementation. In some examples, the DFE portion includes the signaling and interfacing design of Buffer 210 to DAC1 212 as shown in FIG. 2 and FIGS. 3A-3C. In some examples, the implementation of the subject technology in FIG. 8 may be limited to the signaling at the input of DAC1 212. In some implementations, for minimum delay time, the digital decision output signals from the buffer 210 may be fed directly to DAC1 212 input without any signal conversion. In FIG. 8, the left diagram 802 illustrates a previous implementation of the signaling and interfacing portion of a DFE with no memory clearance. In some examples, the left diagram 802 shows a typical decision digital signal NRZ (non-return to zero) which is used as the digital input to be converted to analog output signal. The top portion of the diagram 802 illustrates a digital-in signal and the bottom portion of the diagram 802 illustrates an analog-out signal. The right diagram 804 illustrates an example signaling and interfacing portion of the DFE implementation of the subject technology with memory clearance with return-to-zero (RZ) digital-in signal processing. The top portion of the diagram 804 illustrates a digital-in signal, and the bottom portion of the diagram 804 illustrates an analog-out signal. In RZ digital-in signaling, the signal drops (returns) to zero between each pulse. Inverted-return-to-zero (IRZ) may be implemented by the DFE in the diagram 804 by using a FET switching pair, such as P-FET switching pair D11 and D12 in DAC1 212 of FIG. 3C. When IRZ is implemented, with RZ digital in signal, in zero state, both sides of the analog out may not be Off but inverted to be On and have the same amplitudes.

According to FIG. 8, a ZERO state may be achieved immediately at the initial point of digital-in in the diagram 804. In the example DFE of the diagram 804, a digital-in "Full" level (which may be needed to achieve full settled amplitude on the Analog Out) may not be VDD as shown in the diagram 802 but significantly lower in the order of VDD/2. The interval between two hollow round circles may represent one constant time interval (e.g., relative to or determined by the system parameters) in FIG. 8. The time needed from initial to fully settled for the analog-out signal t initial→settled may be shorter (about 2 constant time intervals) in the diagram 804 compared with the diagram 802 (about 3 constant time intervals) because it may take extra time to clear the large previous input symbol memory for the implementation in the diagram 802. Thus, the delay time may be much shorter for the DFE of the diagram 804 and it may also benefit from the digital-in first time constant effect.

The high and low levels of the clock signals disclosed herein may be reversed depending on the p-type or n-type design of the circuit components of each of the feedback tabs.

Figure 9:
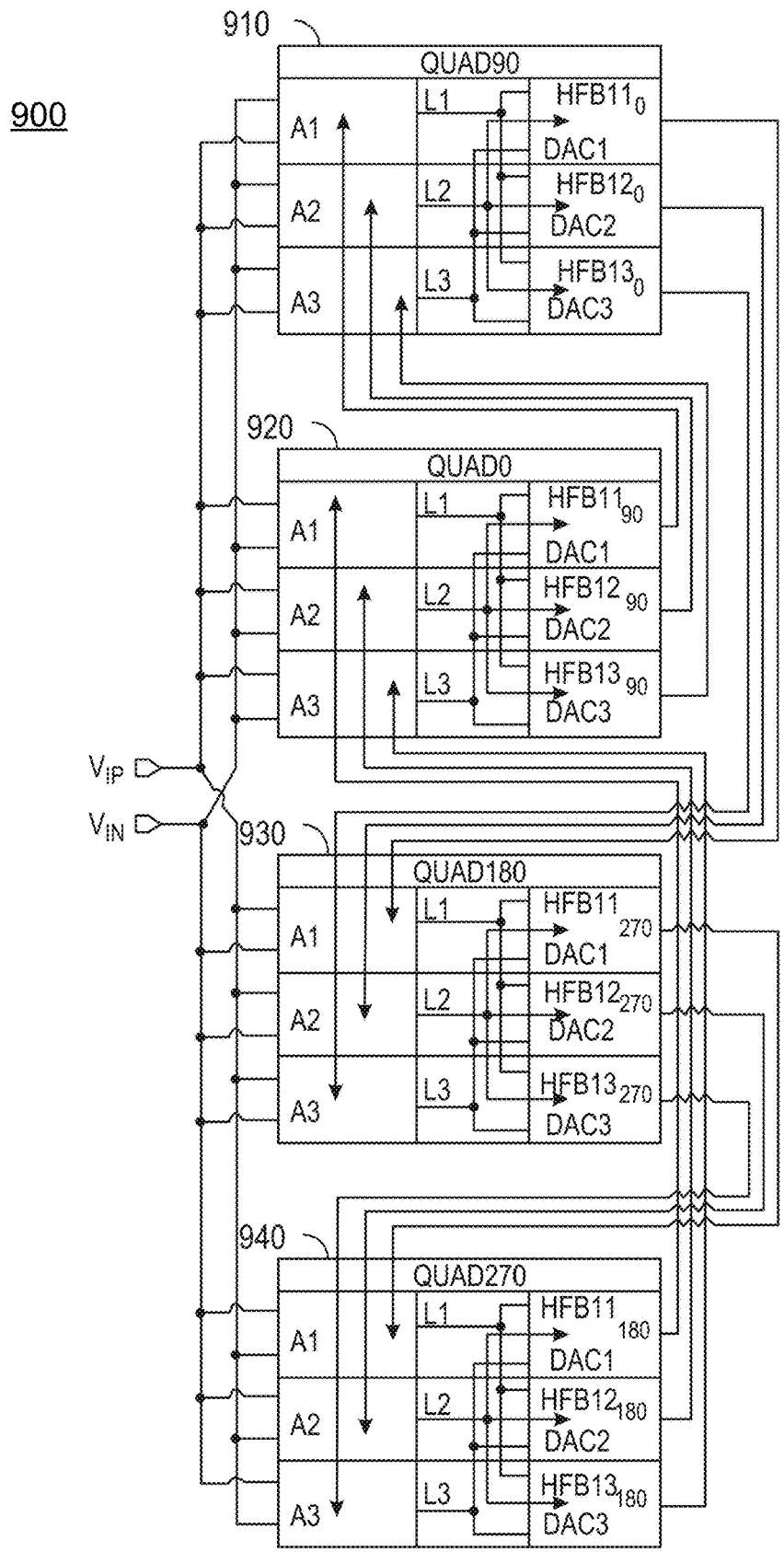
FIG. 9 illustrates a structure diagram of an example quarter-rate DFE.

FIG. 9 illustrates a structure diagram of an example quarter-rate DFE. Referring to FIG. 9, in one or more example implementations, when a DFE is configured as a quarter-rate DFE 900, the first 0-90 degree phase interval feedback tap 910 may have a same or similar structure as tab 1E in FIG. 6 including three pre-amplifiers A1, A2, and A3, three combined latches L1, L2, and L3, and three DACs DAC1, DAC2 and DAC3. The three DACs may generate three H1 feedback signals HFB11, HFB12, and HFB13. The output of the first 0-90 degree phase interval feedback tap 910 may be coupled to the input of a first 90-180 degree phase interval feedback tap 920. The output of the first 90-180 degree phase interval feedback tap 920 may be coupled to the input of a first 180-270 degree phase interval feedback tap 930. The output of the first 180-270 degree phase interval feedback tap 930 may be coupled to the input of a first 270-360 degree phase interval feedback tap 940. The output of the first 270-360 degree phase interval feedback tap 940 may be coupled back to the input of the first 0-90 degree phase interval feedback tap 910. Tabs 910, 920, 930 and 940 may have similar or the same structures. A quarter-rate DFE 900 may process an input format, such as PAM-2, PAM-4, PAM-6, PAM-8, etc.

While example structures of a DFE at a half rate or a quarter rate are described in connection with PAM-n signals, the subject technology is not limited to thereto.

Various example embodiments and aspects of the disclosure are described below for convenience. These are provided as examples, and do not limit the subject technology. Some of the examples described below are illustrated with respect to the figures disclosed herein simply for illustration purposes without limiting the scope of the subject technology.

One or more implementations provide a decision feedback equalizer (DFE) (e.g., 200 of FIG. 1, FIG. 2, and FIG. 6). The DFE may include: a summer (e.g., 1SE or 202 of FIG. 1, FIG. 2, and FIG. 6) configured to receive a signal stream; and a plurality of feedback taps (e.g., 1E, 2E, 3E, . . . of FIG. 1). In some examples, an input node of a first feedback tap (e.g., 1E of FIG. 1, FIG. 2, and FIG. 6) of the plurality of feedback taps is coupled to an output node of the summer, and the first feedback tap includes: a pre-amplifier (e.g., 204 of FIG. 2, FIG. 3A, and FIG. 6) configured to be clocked by a first clock signal (e.g., CK1 of FIG. 2, and FIG. 5), wherein the pre-amplifier is configured to receive an output signal of the summer and to receive a first postcursor (e.g., H1E of FIG. 1 and FIG. 2, HFB11' of FIG. 6) generated by the DFE of a previous signal in the signal stream, and wherein the first postcursor is for being provided to the pre-amplifier without being provided to the summer: a combined latch (e.g., 206 of FIG. 2 and FIG. 6) coupled to an output node of the pre-amplifier; and a digital to analog converter (DAC) (e.g., 212 of FIG. 2 and FIG. 3C) coupled to an output node of the combined latch. In some examples, the combined latch includes: a latch amplifier (e.g., 208A of FIG. 2 and FIG. 3A) configured to be clocked by the first clock signal and a second clock signal (e.g., CK2 of FIG. 2, and FIG. 5), wherein both the first clock signal and the second clock signal are configured to be determined by a main clock (e.g., see FIG. 5) of the DFE: a main latch (e.g., 208B of FIG. 2 and FIG. 3A) configured to be clocked by the second clock signal; and a buffer amplifier (e.g., 210 of FIG. 2 and FIG. 3A) configured to be clocked by an inverse signal of the second clock signal.

In one or more examples, the second clock signal is half rate delayed by a predetermined ratio of a unit interval from the first clock signal.

In one or more examples, the predetermined ratio of the unit interval is a half of the unit interval.

In one or more examples, the pre-amplifier is configured to clear its memory when the first clock signal is in a low state.

In one or more examples, the pre-amplifier is configured to be controlled by a plurality of biases; the pre-amplifier is configured to be in a low gain mode when the first clock signal is in a low state; the pre-amplifier is configured to be in a high gain mode when the first clock signal is in a high state; in the low gain mode, the pre-amplifier has a first pre-amplifier gain; and in the high gain mode, the pre-amplifier has a second pre-amplifier gain. In some examples, the first pre-amplifier gain is smaller than the second pre-amplifier gain.

In one or more examples, the latch amplifier, the main latch and the buffer amplifier are configured to be in a low gain mode when the second clock signal is in a low state; the latch amplifier, the main latch and the buffer amplifier are configured to be in a high gain mode when the second clock signal is in a high state; in the low gain mode, the latch amplifier has a first latch amplifier gain, the main latch has a first main latch gain, and the buffer amplifier has a first buffer amplifier gain; and in the high gain mode, the latch amplifier has a second latch amplifier gain, the main latch has a second main latch gain, and the buffer amplifier has a second buffer amplifier gain. In some examples, the first latch amplifier gain is smaller than the second latch amplifier gain, the first main latch gain is smaller than the second main latch gain, and the first buffer amplifier gain is smaller than the second buffer amplifier gain.

In one or more examples, the output signal of the summer is a summation from even components of: all precursors and all postcursors generated by a feed-forward equalizer (FFE), a current signal of the signal stream, and all postcursors except the first postcursor generated by the DFE of previous signals in the signal stream received by the summer (e.g., input signals to 1SE or 202 in FIG. 1 and FIG. 2). In some examples, the DFE is configured as a half-rate DFE.

In one or more examples, the DFE comprises a second plurality of feedback taps (e.g., 1O, 2O, 3O, . . . of FIG. 1) in parallel to the plurality of feedback taps; the second plurality of feedback taps comprises a second feedback tap (e.g., 1O of FIG. 1, FIG. 2, and FIG. 6); an input node of the pre-amplifier of the first feedback tap is coupled to an output node of the second feedback tap; and the second feedback tap is configured to output the first postcursor.

In one or more examples, the DFE is configured to receive the signal stream in a pulse amplitude modulation n-level (PAM-n) format, and n is a positive integer.

In one or more examples, the DFE is configured as a half-rate DFE (e.g., 200 of FIG. 1. FIG. 2, and FIG. 6), the DFE comprises a second summer (e.g., 1SO or 202' of FIG. 1 and FIG. 2) and a second plurality of feedback taps (e.g., 1O, 2O, 3O, . . . of FIG. 1), the second plurality of feedback taps comprise a first odd interval feedback tap (e.g., 1O of FIG. 1, FIG. 2, and FIG. 6), the first feedback tap is a first even interval feedback tap, an output node of the first even interval feedback tap is coupled to an input node of the first odd interval feedback tap, and an output of the first odd interval feedback tap is coupled back to the input node of the first even interval feedback tap.

In one or more examples, the DFE is configured as a quarter-rate DFE (e.g., 900 of FIG. 9), the first feedback tap (e.g., 910 of FIG. 9) is a first 0-90 degree phase interval feedback tap, an output node of the first 0-90 degree phase interval feedback tap is coupled to an input node of a first 90-180 degree phase interval feedback tap (e.g., 930 of FIG. 9), an output node of the first 90-180 degree phase interval feedback tap is coupled to an input node of a first 180-270 degree phase interval feedback tap (e.g., 940 of FIG. 9), an output node of the first 180-270 degree phase interval feedback tap is coupled to an input node of a first 270-360 degree phase interval feedback tap (e.g., 920 of FIG. 9), and an output node of the first 270-360 degree phase interval feedback tap is coupled back to an input node of the first 0-90 degree phase interval feedback tap.

In one or more examples, an output signal of the first feedback tap is a summation of decisions of three eyes of the signal stream received in a PAM-4 format (e.g., as shown in FIG. 6).

In one or more examples, the pre-amplifier comprises three pre-amplifiers (e.g., 204-1, 204-2 and 204-3 of FIG. 3A and FIG. 6); the combined latch comprises three combined latches (e.g., 206-1, 206-2 and 206-3 of FIG. 3A and FIG. 6); each of the three pre-amplifiers is configured to receive the same output signal of the summer; each of the three pre-amplifiers is configured to receive a respective first postcursor (e.g., HFB11', HFB12', and HFB13' of FIG. 6); each of the three pre-amplifiers is configured to produce an output signal corresponding to one eye of the three eyes of the signal stream; and each of the three combined latches is configured to produce an output signal corresponding to one eye of the three eyes of the signal stream.

In one or more examples, the DAC comprises three groups of DACs (e.g., 212-1, 212-2 and 212-3 of FIG. 3C and FIG. 6); each of the three groups of DACs comprises three DACs (e.g., 212-A, 212-B and 212-C of FIG. 3C); each of the three DACs is configured to produce an output signal corresponding to one eye of the three eyes of the signal stream; and each of the three groups of DACs is configured to combine output signals of the corresponding three DACs.

In one or more examples, the DFE comprises a second summer and a second plurality of feedback taps; the second plurality of feedback taps comprises a second feedback tap; the second summer is coupled in parallel to the summer; the second plurality of feedback taps are coupled in parallel to the plurality of feedback taps; the second feedback tap comprises three pre-amplifiers; and an input node of each of the three pre-amplifiers of the second feedback tap is coupled to an output node of a corresponding one of the three groups of DACs.

In one or more examples, the buffer amplifier is configured to be biased by a common-mode (CM) output voltage.

One or more implementations provide a method of providing a decision feedback equalizer (DFE). The method may include: configuring a summer to receive a signal stream; providing a plurality of feedback taps including a first feedback tap; and coupling an input node of the first feedback tap to an output node of the summer. In some examples, providing the plurality of feedback taps including the first feedback tap comprises: configuring a pre-amplifier of the first feedback tap to be clocked by a first clock signal, wherein the pre-amplifier is configured to receive an output signal of the summer and to receive a first postcursor generated by the DFE of a previous signal in the signal stream, and wherein the first postcursor is for being provided to the pre-amplifier without being provided to the summer; coupling a combined latch of the first feedback tap to an output node of the pre-amplifier; and coupling a digital to analog converter (DAC) of the first feedback tap to an output node of the combined latch. In some examples, the combined latch comprises: a latch amplifier configured to be clocked by the first clock signal and a second clock signal, wherein both the first clock signal and the second clock signal are configured to be determined by a main clock of the DFE; a main latch configured to be clocked by the second clock signal; and a buffer amplifier configured to be clocked by an inverse signal of the second clock signal.

In one or more aspects, the method of providing a DFE, may further include: configuring the pre-amplifier to be controlled by a plurality of biases; configuring the pre-amplifier to be in a low gain mode when the first clock signal is in a low state; and configuring the pre-amplifier to be in a high gain mode when the first clock signal is in a high state. In some examples, in the low gain mode, the pre-amplifier has a first pre-amplifier gain; in the high gain mode, the pre-amplifier has a second pre-amplifier gain; and the first pre-amplifier gain is smaller than the second pre-amplifier gain.

In one or more aspects, the method of providing a DFE, may further include: configuring the latch amplifier, the main latch and the buffer amplifier to be in a low gain mode when the second clock signal is in a low state; and configuring the latch amplifier, the main latch and the buffer amplifier to be in a high gain mode when the second clock signal is in a high state. In some examples, in the low gain mode, the latch amplifier has a first latch amplifier gain, the main latch has a first main latch gain, and the buffer amplifier has a first buffer amplifier gain; in the high gain mode, the latch amplifier has a second latch amplifier gain, the main latch has a second main latch gain, and the buffer amplifier has a second buffer amplifier gain; and the first latch amplifier gain is smaller than the second latch amplifier gain, the first main latch gain is smaller than the second main latch gain, and the first buffer amplifier gain is smaller than the second buffer amplifier gain.

One or more implementations provide a decision feedback equalizer (DFE), comprising: a summer configured to receive a signal stream; and a plurality of feedback taps. In some examples, an input node of a first feedback tap of the plurality of feedback taps is coupled to an output node of the summer, and the first feedback tap may include: a pre-amplifier configured to be clocked by a first clock signal, wherein the pre-amplifier is configured to receive an output signal of the summer and to receive a first postcursor generated by the DFE of a previous signal in the signal stream and wherein the first postcursor is for being provided to the pre-amplifier without being provided to the summer; a combined latch configured to be clocked by the first clock signal and a second clock signal, wherein the combined latch is coupled to an output node of the pre-amplifier, and wherein both the first clock signal and the second clock signal are configured to be determined by a main clock of the DFE; and a digital to analog converter (DAC) coupled to an output node of the combined latch.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

Further examples of the subject technology include various subsets of the above examples combined or otherwise re-arranged in various forms.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In one aspect, the blocks or components described in this present disclosure (e.g., components in FIGS. 1 to 3C, 6, and 9) may be implemented in circuits or integrated circuits. A circuit or an integrated circuit may include one or more transistors.

In one or more aspects, a transistor may include one or more bipolar junction transistors (BJTs), which may refer to any of a variety of multi-terminal transistors operating on the principal of carrying current using both electrons and holes, including, but not limited to, an n-p-n BJT (NPN BJT) and a p-n-p BJT (PNP BJT).

In one or more aspects, transistors may include one or more field effect transistors (FETs), which may refer to any of a variety of multi-terminal transistors operating on the principals of controlling an electric field to control the shape and hence the conductivity of a channel of one type of charge carrier in a semiconductor material, including, but not limited to, a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET). A MOSFET may be an n-type MOSFET (NMOS) or a p-type MOSFET (PMOS). A complementary metal-oxide semiconductor (CMOS) device may include an NMOS and a PMOS.

In one or more aspects, transistors may include one or more BJTs and FETs. In one or more examples, transistors may include one or more BJTs and one or more CMOS devices, which may be referred to as Bi-CMOS devices.

Unless otherwise mentioned, various configurations described in the present disclosure may be implemented on a silicon, silicon-germanium (SiGe), gallium arsenide (GaAs), indium phosphide (InP) or indium gallium phosphide (InGaP) substrate, or any other suitable substrate.

In one aspect, the terms base, emitter, and collector may refer to three terminals of a transistor and may refer to a base, an emitter and a collector of a bipolar junction transistor or may refer to a gate, a source, and a drain of a field effect transistor, respectively, and vice versa. In another aspect, the terms gate, source, and drain may refer to base, emitter, and collector of a transistor, respectively, and vice versa. In some aspects, a source and a drain may be used interchangeably.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next." "before," "preceding." "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may have been omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A decision feedback equalizer (DFE), comprising:
   a summer configured to receive a signal stream; and
   a plurality of feedback taps;
   wherein an input node of a first feedback tap of the plurality of feedback taps is coupled to an output node of the summer, and the first feedback tap comprises:

a pre-amplifier configured to be clocked by a first clock signal, wherein the pre-amplifier is configured to receive an output signal of the summer and to receive a first postcursor generated by the DFE of a previous signal in the signal stream;

a combined latch coupled to an output node of the pre-amplifier, wherein the combined latch comprises:

a latch amplifier configured to be clocked by the first clock signal and a second clock signal, wherein both the first clock signal and the second clock signal are configured to be determined by a main clock of the DFE;

a main latch configured to be clocked by the second clock signal; and a buffer amplifier configured to be clocked by an inverse signal of the second clock signal; and a digital to analog converter (DAC) coupled to an output node of the combined latch, wherein the first postcursor is for being provided to the pre-amplifier without being provided to the summer.

2. The DFE according to claim 1, wherein the second clock signal is half rate delayed by a predetermined ratio of a unit interval from the first clock signal.

3. The DFE according to claim 2, wherein the predetermined ratio of the unit interval is a half of the unit interval.

4. The DFE according to claim 1, wherein the pre-amplifier is configured to clear its memory when the first clock signal is in a low state.

5. The DFE according to claim 1, wherein:

the pre-amplifier is configured to be controlled by a plurality of biases;

the pre-amplifier is configured to be in a low gain mode when the first clock signal is in a low state;

the pre-amplifier is configured to be in a high gain mode when the first clock signal is in a high state;

in the low gain mode, the pre-amplifier has a first pre-amplifier gain; and in the high gain mode, the pre-amplifier has a second pre-amplifier gain;

wherein the first pre-amplifier gain is smaller than the second pre-amplifier gain.

6. The DFE according to claim 1, wherein:

the latch amplifier, the main latch and the buffer amplifier are configured to be in a low gain mode when the second clock signal is in a low state;

the latch amplifier, the main latch and the buffer amplifier are configured to be in a high gain mode when the second clock signal is in a high state;

in the low gain mode, the latch amplifier has a first latch amplifier gain, the main latch has a first main latch gain, and the buffer amplifier has a first buffer amplifier gain; and in the high gain mode, the latch amplifier has a second latch amplifier gain, the main latch has a second main latch gain, and the buffer amplifier has a second buffer amplifier gain;

wherein the first latch amplifier gain is smaller than the second latch amplifier gain, the first main latch gain is smaller than the second main latch gain, and the first buffer amplifier gain is smaller than the second buffer amplifier gain.

7. The DFE according to claim 1, wherein the output signal of the summer is a summation from even components of all precursors and all postcursors generated by a feed-forward equalizer (FFE), a current signal of the signal stream, and all postcursors except the first postcursor generated by the DFE of previous signals in the signal stream received by the summer, wherein the DFE is configured as a half-rate DFE.

8. The DFE according to claim 1, wherein:

the DFE comprises a second plurality of feedback taps in parallel to the plurality of feedback taps;

the second plurality of feedback taps comprises a second feedback tap;

an input node of the pre-amplifier of the first feedback tap is coupled to an output node of the second feedback tap; and the second feedback tap is configured to output the first postcursor.

9. The DFE according to claim 1, wherein the DFE is configured to receive the signal stream in a pulse amplitude modulation n-level (PAM-n) format, and n is a positive integer.

10. The DFE according to claim 1, wherein the DFE is configured as a half-rate DFE, the DFE comprises a second summer and a second plurality of feedback taps, the second plurality of feedback taps comprise a first odd interval feedback tap, the first feedback tap is a first even interval feedback tap, an output node of the first even interval feedback tap is coupled to an input node of the first odd interval feedback tap, and an output of the first odd interval feedback tap is coupled back to the input node of the first even interval feedback tap.

11. The DFE according to claim 1, wherein the DFE is configured as a quarter-rate DFE, the first feedback tap is a first 0-90 degree phase interval feedback tap, an output node of the first 0-90 degree phase interval feedback tap is coupled to an input node of a first 90-180 degree phase interval feedback tap, an output node of the first 90-180 degree phase interval feedback tap is coupled to an input node of a first 180-270 degree phase interval feedback tap, an output node of the first 180-270 degree phase interval feedback tap is coupled to an input node of a first 270-360 degree phase interval feedback tap, and an output node of the first 270-360 degree phase interval feedback tap is coupled back to an input node of the first 0-90 degree phase interval feedback tap.

12. The DFE according to claim 1, wherein an output signal of the first feedback tap is a summation of decisions of three eyes of the signal stream received in a PAM-4 format.

13. The DFE according to claim 12, wherein:

the pre-amplifier comprises three pre-amplifiers;

the combined latch comprises three combined latches;

each of the three pre-amplifiers is configured to receive the same output signal of the summer;

each of the three pre-amplifiers is configured to receive a respective first postcursor;

each of the three pre-amplifiers is configured to produce an output signal corresponding to one eye of the three eyes of the signal stream; and each of the three combined latches is configured to produce an output signal corresponding to one eye of the three eyes of the signal stream.

14. The DFE according to claim 12, wherein:

the DAC comprises three groups of DACs;

each of the three groups of DACs comprises three DACs;

each of the three DACs is configured to produce an output signal corresponding to one eye of the three eyes of the signal stream; and each of the three groups of DACs is configured to combine output signals of the corresponding three DACs.

15. The DFE according to claim 14, wherein:
the DFE comprises a second summer and a second plurality of feedback taps;
the second plurality of feedback taps comprises a second feedback tap;
the second summer is coupled in parallel to the summer;
the second plurality of feedback taps are coupled in parallel to the plurality of feedback taps;
the second feedback tap comprises three pre-amplifiers; and
an input node of each of the three pre-amplifiers of the second feedback tap is coupled to an output node of a corresponding one of the three groups of DACs.

16. The DFE according to claim 1, the buffer amplifier is configured to be biased by a common-mode (CM) output voltage.

17. A method of providing a decision feedback equalizer (DFE), comprising:
configuring a summer to receive a signal stream;
providing a plurality of feedback taps including a first feedback tap; and
coupling an input node of the first feedback tap to an output node of the summer,
wherein providing the plurality of feedback taps including the first feedback tap comprises:
configuring a pre-amplifier of the first feedback tap to be clocked by a first clock signal, wherein the pre-amplifier is configured to receive an output signal of the summer and to receive a first postcursor generated by the DFE of a previous signal in the signal stream;
coupling a combined latch of the first feedback tap to an output node of the pre-amplifier, wherein the combined latch comprises:
a latch amplifier configured to be clocked by the first clock signal and a second clock signal, wherein both the first clock signal and the second clock signal are configured to be determined by a main clock of the DFE;
a main latch configured to be clocked by the second clock signal; and
a buffer amplifier configured to be clocked by an inverse signal of the second clock signal; and
coupling a digital to analog converter (DAC) of the first feedback tap to an output node of the combined latch,
wherein the first postcursor is for being provided to the pre-amplifier without being provided to the summer.

18. The method of claim 17, further comprising:
configuring the pre-amplifier to be controlled by a plurality of biases;
configuring the pre-amplifier to be in a low gain mode when the first clock signal is in a low state; and
configuring the pre-amplifier to be in a high gain mode when the first clock signal is in a high state,
wherein:
in the low gain mode, the pre-amplifier has a first pre-amplifier gain;
in the high gain mode, the pre-amplifier has a second pre-amplifier gain; and
the first pre-amplifier gain is smaller than the second pre-amplifier gain.

19. The method of claim 17, further comprising:
configuring the latch amplifier, the main latch and the buffer amplifier to be in a low gain mode when the second clock signal is in a low state; and
configuring the latch amplifier, the main latch and the buffer amplifier to be in a high gain mode when the second clock signal is in a high state,
wherein:
in the low gain mode, the latch amplifier has a first latch amplifier gain, the main latch has a first main latch gain, and the buffer amplifier has a first buffer amplifier gain;
in the high gain mode, the latch amplifier has a second latch amplifier gain, the main latch has a second main latch gain, and the buffer amplifier has a second buffer amplifier gain; and
the first latch amplifier gain is smaller than the second latch amplifier gain, the first main latch gain is smaller than the second main latch gain, and the first buffer amplifier gain is smaller than the second buffer amplifier gain.

20. A decision feedback equalizer (DFE), comprising:
a summer configured to receive a signal stream; and
a plurality of feedback taps;
wherein an input node of a first feedback tap of the plurality of feedback taps is coupled to an output node of the summer, and the first feedback tap comprises:
a pre-amplifier configured to be clocked by a first clock signal, wherein the pre-amplifier is configured to receive an output signal of the summer and to receive a first postcursor generated by the DFE of a previous signal in the signal stream;
a combined latch configured to be clocked by the first clock signal and a second clock signal, the combined latch coupled to an output node of the pre-amplifier, wherein both the first clock signal and the second clock signal are configured to be determined by a main clock of the DFE; and
a digital to analog converter (DAC) coupled to an output node of the combined latch,
wherein the first postcursor is for being provided to the pre-amplifier without being provided to the summer.

* * * * *